US007389338B2

United States Patent
Sato et al.

(10) Patent No.: US 7,389,338 B2
(45) Date of Patent: *Jun. 17, 2008

(54) INFORMATION PROCESSING METHOD AND SYSTEM FOR RESERVING AN INFORMATION PROCESSING APPARATUS HAVING GLOBALLY UNIQUE IDENTIFICATION INFORMATION

(75) Inventors: Naoyuki Sato, Tokyo (JP); Harumi Kawamura, Tokyo (JP)

(73) Assignee: Sony Corporation (JP)

( * ) Notice: Subject to any disclaimer, the term of this patent is extended or adjusted under 35 U.S.C. 154(b) by 178 days.

This patent is subject to a terminal disclaimer.

(21) Appl. No.: 11/361,607

(22) Filed: Feb. 24, 2006

(65) Prior Publication Data

US 2006/0143288 A1 Jun. 29, 2006

Related U.S. Application Data

(63) Continuation of application No. 09/908,373, filed on Jul. 18, 2001, now Pat. No. 7,043,542.

(30) Foreign Application Priority Data

Jul. 18, 2000 (JP) ............................ 2000-217866

(51) Int. Cl.
*G06F 15/173* (2006.01)

(52) U.S. Cl. ...................................... 709/223; 710/305

(58) Field of Classification Search ................ 709/223; 710/312, 305
See application file for complete search history.

(56) References Cited

U.S. PATENT DOCUMENTS 6,366,964 B1    4/2002   Shima et al.

(Continued)

FOREIGN PATENT DOCUMENTS

EP          0 929 170 A2      7/1999

(Continued)

OTHER PUBLICATIONS

Printer Working Group C et al., "PWG-C Proposal to the 1394 Trade Association AV WG: AV/C Managed Asynchronous Serial Bus Connections", 1394 Trade Association, Jul. 7, 1998, pp. 1-90.

(Continued)

*Primary Examiner*—Jungwon Chang
(74) *Attorney, Agent, or Firm*—Lerner, David, Littenberg, Krumholz & Mentlik, LLP

(57) ABSTRACT

In the case where a reservation has been made via a bridge in, e.g., an IEEE 1394 serial data bus, and bus resetting has occurred in a bus connected to the reserve owner, it is desirable that another bus connected to the bridge is able to find the reserve owner. To this end, a controller A sends its own EUI-64 to a target to be reserved. The target stores the information of at least some of the functions of the target itself as reserved and the EUI-64 of the device (node) which has made the reservation for use. In attempting to reserve the target, the controller B reads out the EUI-64 of the reserve owner from the target and verifies whether or not the reservation is possible. If the reservation is possible, the controller B writes its own EUI-64 in the target.

10 Claims, 30 Drawing Sheets

U.S. PATENT DOCUMENTS

| | | |
|---|---|---|
| 6,480,889 B1 | 11/2002 | Saito et al. |
| 6,493,769 B1 | 12/2002 | Kawamura et al. |
| 6,513,064 B1 | 1/2003 | Horiguchi et al. |
| 6,671,759 B1 | 12/2003 | Noda et al. |
| 6,678,781 B1 | 1/2004 | Domon |
| 6,704,819 B1 | 3/2004 | Chrysanthakopoulos |
| 6,738,835 B1 | 5/2004 | Kato et al. |
| 6,804,734 B2 | 10/2004 | Kimura |
| 7,043,542 B2 * | 5/2006 | Sato et al. ................... 709/223 |
| 2003/0014514 A1 | 1/2003 | Saito et al. |

FOREIGN PATENT DOCUMENTS

| | | |
|---|---|---|
| WO | WO-99/65190 A1 | 12/1999 |

OTHER PUBLICATIONS

Johansson, Peter, "P1394.1 Virtual Node IDs", IEEE 1394 Working Group, Jun. 9, 1998, pp. 1-13.

James, David V., "Contribution to 1394.1 WG-BR075R00: Bus Discovery", IEEE 1394 Working Group, Dec. 1, 1999, pp. 1-7.

* cited by examiner

| OFFSET | NAME | OPERATION |
|---|---|---|
| 000h | STATE_CLEAR | STATUS AND CONTROL INFORMATION |
| 004h | STATE_SET | SET STATE_CLEAR BIT |
| 008h | NODE_IDs | SHOW 16-BIT NODE ID |
| 00Ch | RESET_START | START COMMAND RESET |
| 018h-01Ch | SPLIT_TIMEOUT | SET MAX SPLIT TIME |
| 200h | CYCLE_TIME | CYCLE TIME |
| 210h | BUSY_TIMEOUT | SET RETRY PERIOD |
| 21Ch | BUS_MANAGER | SHOW BUS MANAGER ID |
| 220h | BANDWIDTH_AVAILABLE | SHOW BAND ASSIGNABLE TO ISOCHRONOUS COMMUNICATION |
| 224h-228h | CHANNELS_AVAILABLE | SHOW USE STATE OF EACH CHANNEL |

FIG.5

| info_length | crc_length | rom_crc_value |
|---|---|---|
| bus_info_block | | |
| root_directory | | |
| unit_directories | | |
| root&unit leaves | | |
| vendor_dependent_information | | | info_length spans bus_info_block

FIG.6

| 400h | 04h | crc_length | rom_crc_value |

Bus_info_block

| 404h | "1394" |||
|---|---|---|---|
| 408h | irmc / cmc / isc / bmc / reserved | cyc_clk_acc | max_rec | reserved |
| 40Ch | Company_ID || Chip_ID_hi |
| 410h | Chip_ID_lo |||

Root_directory

| 414h | root_length | CRC |
|---|---|---|
| 418h | 03h | module_vendor_id |
| 41Ch | 0Ch | node_capabilities |
| 420h | 8Dh | node_unique_id offset |
| 424h | D1h | unit_directory_offset |
| 428h | Optional. ||
| ⋮ |  |  |

Unit_directory

| unit_directory_length | CRC |
|---|---|
| 12h | unit_spec_id |
| 13h | unit_sw_version |
| Optional. ||

FIG.7

| Address | Register |
|---|---|
| 900h | Output Master Plug Register |
| 904h | Output Plug Control Register #0 |
| 908h | Output Plug Control Register #1 |
| ... | ... |
| 97Ch | Output Plug Control Register #30 |
| 980h | Input Master Plug Register |
| 984h | Input Plug Control Register #0 |
| 988h | Input Plug Control Register #1 |
| ... | ... |
| 9FCh | Input Plug Control Register #30 |

FIG.8

FIG.9A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG.9B oPCR [n]

| on-line | broadcast connection counter | point-to-point connection counter | reserved | channel number | data rate | overhead ID | payload |
|---|---|---|---|---|---|---|---|
| 1 | 1 | 6 | 2 | 6 | 2 | 4 | 10 (bit) |

FIG.9C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG.9D iPCR [n]

| on-line | broadcast connection counter | point-to-point connection counter | reserved | channel number | reserved |
|---|---|---|---|---|---|
| 1 | 1 | 6 | 2 | 6 | 16 (bit) |

| The General Subunit Identifier Descriptor | |
|---|---|
| address | contents |
| 00 00$_{16}$ | descriptor_length |
| 00 01$_{16}$ | |
| 00 02$_{16}$ | generation_ID |
| 00 03$_{16}$ | size_of_list_ID |
| 00 04$_{16}$ | size_of_object_ID |
| 00 05$_{16}$ | size_of_object_position |
| 00 06$_{16}$ | number_of_root_object_lists(n) |
| 00 07$_{16}$ | |
| 00 08$_{16}$ | root_object_list_id_0 |
| ⋮ | ⋮ |
| ⋮ | root_object_list_id_n-1 |
| ⋮ | subunit_dependent_length |
| ⋮ | subunit_dependent_information |
| ⋮ | manufacturer_dependent_length |
| ⋮ | manufacturer_dependent_information |

FIG.12

| generation_ID values ||
|---|---|
| generation_ID | meaning |
| $00_{16}$ | Data structures and command sets as specified in the AV/C General Specification, version 3.0 |
| all others | reserved for future specification |

FIG.13

| List ID Value Assignment Ranges ||
|---|---|
| range of values | list definition |
| $0000_{16}$-$0FFF_{16}$ | reserved |
| $1000_{16}$-$3FFF_{16}$ | subunit-type dependent |
| $4000_{16}$-$FFFF_{16}$ | reserved |
| 1 $0000_{16}$-max list ID value | subunit-type dependent |

FIG.14 transmitted first

| 0000 | response | subunit _type | subunit ID | opcode | operand[0] |
|---|---|---|---|---|---|
| operand[1] | | operand[2] | | operand[3] | operand[4] |
| operand[n] | zero pad bytes(if necessary) | | | | | transmitted last

FIG.22

| Value | Command type |
|---|---|
| 0 | CONTROL |
| 1 | STATUS |
| 2 | SPECIFIC INQUIRY |
| 3 | NOTIFY |
| 4 | GENERAL INQUIRY |
| 5-7 | Reserved for future specification |
| 8-$F_{16}$ | Reserved for response codes |

FIG.23

| Subunit Type | Meaning |
|---|---|
| 0 | Video monitor |
| 1-2 | Reserved for future specification |
| 3 | disc recorder/player(audio or video) |
| 4 | tape recorder/player(audio or video) |
| 5 | Tuner |
| 6 | Reserved for future specification |
| 7 | Video camera |
| 8-$1B_{16}$ | Reserved for future specification |
| $1C_{16}$ | Vendor unique |
| $1D_{16}$ | Reserved for all subunit types |
| $1E_{16}$ | subunit_type extended to next byte |
| $1F_{16}$ | Unit |

FIG.24

| Subunit ID | Meaning |
|---|---|
| 0-4 | Instance number |
| 5 | subunit_ID extended to next byte |
| 6 | Reserved for all instances |
| 7 | Ignore |

FIG.25

| | msb | | | | | | | lsb |
|---|---|---|---|---|---|---|---|---|
| opcode | RESERVE(0×01) | | | | | | | |
| operand [0] | priority | | | | | | | |
| operand [1] | text | | | | | | | |
| .... | | | | | | | | |
| operand [12] | | | | | | | | |
| operand [13] | EUI-64 | | | | | | | |
| .... | | | | | | | | |
| operand [20] | | | | | | | | |

FIG.26

|  | msb |  |  |  |  |  |  | lsb |
|---|---|---|---|---|---|---|---|---|
| opcode | \multicolumn{8}{c}{RESERVE($01_{16}$)} |
| operand [0] | priority |||||||| 
| operand [1] | EUI-64 [0] ||||||||
| operand [2] | EUI-64 [1] ||||||||
| operand [3] | EUI-64 [2] ||||||||
| operand [4] | EUI-64 [3] ||||||||
| operand [5] | EUI-64 [4] ||||||||
| operand [6] | EUI-64 [5] ||||||||
| operand [7] | EUI-64 [6] ||||||||
| operand [8] | EUI-64 [7] ||||||||

FIG.27

| | | | CONFIGURATION ROM ADDRESS |
|---|---|---|---|
| bus_info_length | crc_length | bus_info_crc | FFFF F000 0400₁₆ |
| "1" | "3" | "3" | "4" | FFFF F000 0404₁₆ |
| irmc cmc isc bmc reserved | cyc_clk_acc | max_rec | reserved | FFFF F000 0408₁₆ |
| node_vendor_id | chip_id_hi | FFFF F000 040C₁₆ |
| chip_id_lo | FFFF F000 0410₁₆ |
| root_length | root_crc | FFFF F000 0414₁₆ |
| 03₁₆ | vendor_ID | FFFF F000 0418₁₆ |
| 81₁₆ | vendor_name | FFFF F000 041C₁₆ |
| 17₁₆ | model_ID | FFFF F000 0420₁₆ |
| 81₁₆ | model_name | FFFF F000 0424₁₆ |
| ...... | ...... | FFFF F000 0428₁₆ |

FIG.28

| Command Priority | Stored Priority |
|---|---|
| 0 - 1 | priority |
| $02_{16}$ - $0E_{16}$ | priority & $0E_{16}$ |
| $0F_{16}$ | priority |

FIG.29

| | msb | | | | | | | lsb |
|---|---|---|---|---|---|---|---|---|
| opcode | \multicolumn{8}{c}{RESERVE($01_{16}$)} |
| operand [0] | | | | | | | | |
| ⋮ | \multicolumn{8}{c}{$FF_{16}$} |
| operand [12] | | | | | | | | |

FIG.30

| Value | Response |
|---|---|
| 0-7 | Reserved for command types |
| 8 | NOT IMPLEMENTED |
| 9 | ACCEPTED |
| $A_{16}$ | REJECTED |
| $B_{16}$ | IN TRANSITION |
| $C_{16}$ | IMPLEMENTED/STABLE |
| $D_{16}$ | CHANGED |
| $E_{16}$ | Reserved for future specification |
| $F_{16}$ | INTERIM |

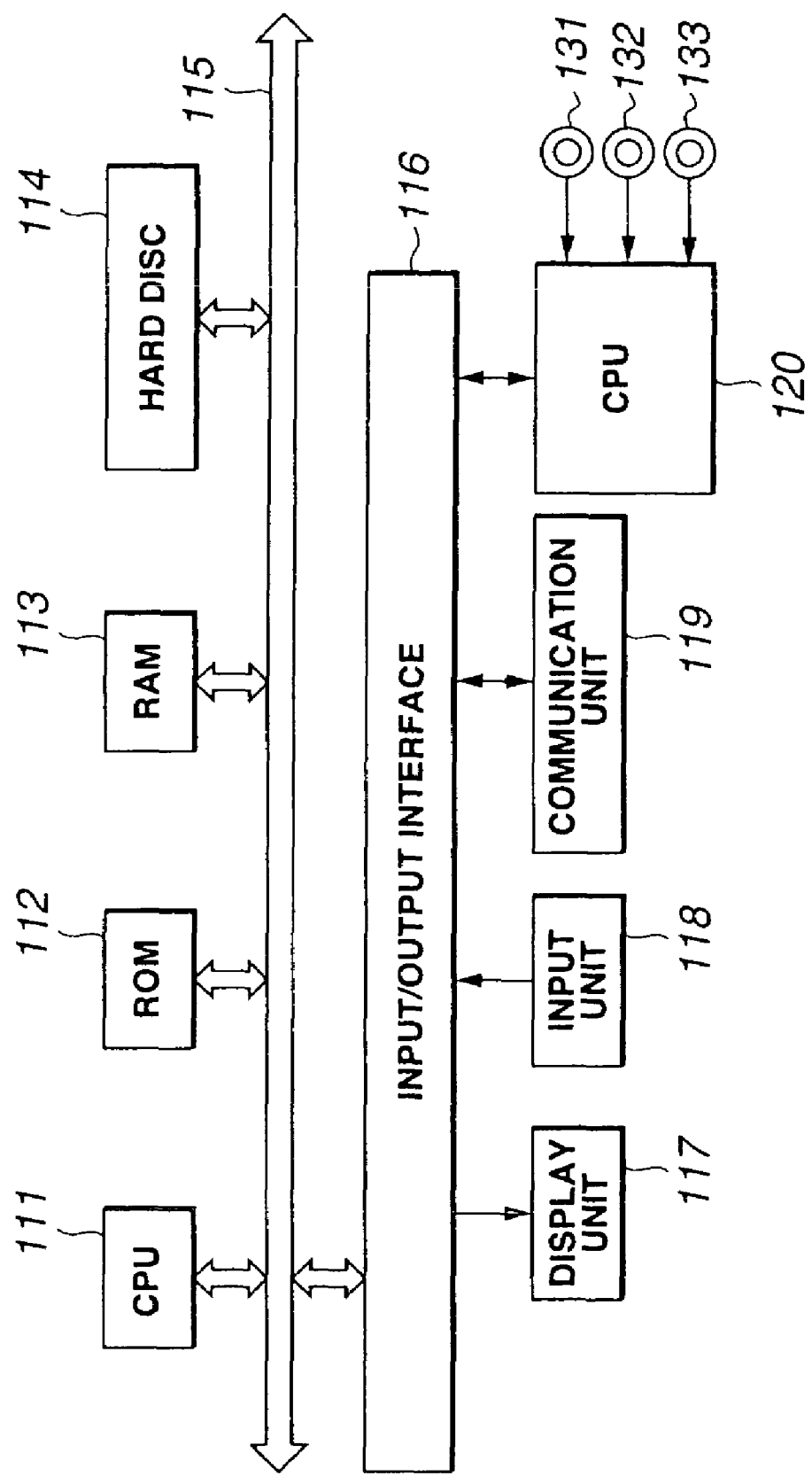

INFORMATION PROCESSING METHOD AND SYSTEM FOR RESERVING AN INFORMATION PROCESSING APPARATUS HAVING GLOBALLY UNIQUE IDENTIFICATION INFORMATION

CROSS-REFERENCE TO RELATED APPLICATIONS

This application is a Continuation of U.S. patent application Ser. No. 09/908,373 filed Jul. 18, 2001 now U.S. Pat. No. 7,043,542, the disclosure of which is hereby incorporated herein by reference, which claims priority from Japanese Application No. P2000-217866 filed Jul. 18, 2000, the disclosure of which is hereby incorporated by reference herein.

BACKGROUND OF THE INVENTION

This invention relates to an information processing apparatus connected to a network formed e.g., by a IEEE 1394 serial data bus, to an information processing method, and to a medium for having the information processing apparatus execute a program.

There has recently been developed AV (audio visual) equipment which allows for reciprocal information transmission over a network employing IEEE 1394 serial data buses standardized by the IEEE (The Institute of Electrical and Electronics Engineers). In this network system, the AV equipment, connected to the IEEE 1394 serial data buses, can be controlled reciprocally using a pre-set digital interface command (AV/C or command transaction set) referred to below as AV/C command. Each electronic device connected to the IEEE 1394 serial data buses is termed a unit, whilst the unit representing the function of each unit is termed a sub-unit. The information stored in each unit can be reciprocally read and written among the respective units using the descriptor prescribed in the general specifications of the AV/C command (AV/C digital interface command set general specification, referred to below as AV/C general).

The IEEE 1394 serial data buses are interconnected by bridges constituted by a set of electronic equipment, termed portals, such that data can be transmitted between two or more buses over the bridges. That is, although the number of devices (nodes) that can be connected to a sole IEEE 1394 serial data bus is limited to 63 at the maximum, more nodes can be connected by interconnecting plural buses over bridges to constitute a network made up of the buses and the bridges.

FIG. 1 shows an illustrative structure of a state in which the IEEE 1394 serial data buses are interconnected over the bridges.

In FIG. 1, nodes 101, 102 are connected to an IEEE 1394 serial data bus 103, whilst nodes 104 to 106 are connected to an IEEE 1394 serial data bus 107. In FIG. 1, the nodes 102, 104 serve as portals, these portals making up a bridge interconnecting the buses 103, 107. In the following, the nodes 102 and 104 are termed portals E and D, respectively. The nodes 101, 106 serve as controllers capable of reserving other equipment, whilst the node 105 is a target reserved by the controller. In the following, the nodes 101 and 106 are termed controllers A and B, respectively. It is assumed that, at this time point, the nodes ID(a), ID(b), ID(c), ID(d) and ID(e) are set in the controller A, controller B, target, portal D and in the portal E, respectively.

The flow in case the controller A reserves a target, and the controller B is searching for the reserve owner reserving the target, is shown in FIG. 2.

As a procedure P11, the controller A sends a reserve control command (RESERVE control command), prescribed as AV/C command, to the target (node 105), to reserve the target. The target reserved returns a response to the controller A while memorizing the node ID of the node which has reserved it (here, ID(a) of the controller A). The reserve control command and the response will be explained subsequently.

Next, as a procedure P12, the controller B sends a reserve status command (RESERVE status command), as later explained, to the target to inquire as to the identity of the reserve owner. This inquiry is made by searching a node ID of the reserve owner memorized by the target. Since the reserve owner at this time point is the controller A, the target notifies the controller B of node ID(a) of the controller A.

This enables the controller B to be apprized in a procedure P13 that the controller A is the reserve owner.

Meanwhile, if bus resetting has occurred on the IEEE 1394 serial data bus, topology re-setting occurs in the bus such that the node ID of each node connected to the bus is set to a new value.

However, the bus reset is not transmitted to outside the bridge, such that the information on the second setting of the node ID performed on a bus where the bus reset has occurred is not transmitted to outside the bridge.

That is, in the case of FIGS. 1 and 2, if a bus reset has occurred between the controller A and the bus 103, as the procedure P14, the node IDs of the controller A and the portal E connected to the bus 103 are updated. FIG. 1 shows a case in which, as a result of bus resetting, the controller A is changed from the node ID(a) to the node ID(f), whilst the portal E is changed from the node ID(e) to the node ID(g).

On the other hand, the controller B or the target of the other bus 107, connected over the bridge, are not aware of the fact that these node IDs have been secondarily set by the resetting of the bus 103.

Thus, if, after occurrence of bus resetting on the bus 103, the controller B makes an inquiry to the target as to the identity of its reserve owner, the latter supplies the controller B with the node ID(a) of the controller A prior to the occurrence of the bus resetting.

However, the node ID of the controller A at this time point has changed to the node ID(f), as described above, such that the controller B is unable to find that the reserve owner is the controller A.

SUMMARY OF THE INVENTION

It is therefore an object of the present invention to provide an information processing method and apparatus and a medium in which, in the case a node has been reserved over a bridge and bus resetting has occurred in a bus connected to the reserve owner, a node of another bus connected to the bridge can find the reserve owner.

In one aspect, the present invention provides an information processing system including a network; a plurality of devices connected to the network, each of the devices having specified functions; and a storage unit operable to store information of at least some of the functions of a first one of the devices for which a reservation for use has been made by a second one of the devices, the storage unit also being operable to store identification information unique to the second one of the devices.

In another aspect, the present invention provides an information processing system including a network; a plurality of devices connected to the network, each of the devices having specified functions, and at least a first one of the devices having a storage unit; and an information processing apparatus connected to the network, the information processing apparatus including a writing unit operable to write identification information unique to a second one of the devices in the storage unit of the first one of the devices when a reservation to use at least some of the functions of the first one of the devices has been made by the second one of the devices.

In another aspect, the present invention provides an information processing system including a network; a plurality of devices connected to the network, each of the devices having specified functions, and at least a first one of the devices having a storage unit; and an information processing apparatus connected to the network, the information processing apparatus including a readout unit operable to read out from the storage unit of the first one of the devices (i) information of at least some of the functions of the first one of the devices for which a reservation for use has been made by a second one of the devices, and (ii) identification information unique to the second one of the devices.

In still another aspect, the present invention provides an information processing system including a network; a plurality of devices connected to the network, each of the devices having specified functions, and at least a first one of the devices having a storage unit; and an information processing apparatus including a readout unit operable to read out from the storage unit of the first one of the devices (i) information of at least some of the functions of the first one of the devices reserved for use by a second one of the devices, and (ii) identification information unique to the second one of the devices, a decision unit operable to verify whether a reservation for use of the first one of the devices by a third one of the devices is possible based on the information read out, and a writing unit operable to write identification information unique to the third one of the devices in the storage unit of the first one of the devices if it is verified that the reservation for use is possible.

In still another aspect, the present invention provides a method for processing information in a network including a plurality of interconnected devices, each of the devices having specified functions. The method includes storing information of at least some of the functions of a first one of the devices for which a reservation for use has been made by a second one of the devices, and storing identification information unique to the second one of the devices.

In yet another aspect, the present invention provides a method for processing information in a network including a plurality of interconnected devices, each of the devices having specified functions, and at least a first one of the devices having a storage unit. The method includes writing identification information unique to a second one of the devices in the storage unit of the first one of the devices when a reservation to use at least some of the functions of the first one of the devices has been made by the second one of the devices.

In still a further aspect, the present invention provides a method of processing information in a network including a plurality of interconnected devices, each of the devices having specified functions, and at least a first one of the devices having a storage unit. The method includes reading out from the storage unit of the first one of the devices (i) information of at least some of the functions of the first one of the devices for which a reservation for use has been made by a second one of the devices, and (ii) identification information unique to the second one of the devices.

In yet another aspect, the present invention provides a method of processing information in a network including a plurality of interconnected devices, each of the devices having specified functions, and at least a first one of the devices having a storage unit. The method includes reading out from the storage unit of the first one of the devices (i) information of at least some of the functions of the first one of the devices reserved for use by a second one of the devices, and (ii) identification information unique to the second one of the devices; verifying whether a reservation for use of the first one of the devices by a third one of the devices is possible based on the information read out; and writing identification information unique to the third one of the devices in the storage unit of the first one of the devices if it is verified that the reservation for use is possible.

In still another aspect, the present invention provides a recording medium having stored therein a program for processing information in a network including a plurality of interconnected devices, each of the devices having specified functions. The program includes storing information of at least some of the functions of a first one of the devices for which a reservation for use has been made by a second one of the devices, and storing identification information unique to the second one of the devices.

In yet a further aspect, the present invention provides a recording medium having stored therein a program for processing information in a network including a plurality of interconnected devices, each of the devices having specified functions, and at least a first one of the devices having a storage unit. The program includes writing identification information unique to a second one of the devices in the storage unit of the first one of the devices when a reservation to use at least some of the functions of the first one of the devices has been made by the second one of the devices.

In still another aspect, the present invention provides a recording medium having stored therein a program for processing information in a network including a plurality of interconnected devices, each of the devices having specified functions, and at least a first one of the devices having a storage unit. The program includes reading out from the storage unit of the first one of the devices (i) information of at least some of the functions of the first one of the devices for which a reservation for use has been made by a second one of the devices, and (ii) identification information unique to the second one of the devices.

In yet another aspect, the present invention provides a recording medium having stored therein a program for processing information in a network including a plurality of interconnected devices, each of the devices having specified functions, and at least a first one of the devices having a storage unit. The program includes reading out from the storage unit of the first one of the devices (i) information of at least some of the functions of the first one of the devices reserved for use by a second one of the devices, and (ii) identification information unique to the second one of the devices; verifying whether a reservation for use of the first one of the devices by a third one of the devices is possible based on the information read out; and writing identification information unique to the third one of the devices in the storage unit of the first one of the devices if it is verified that the reservation for use is possible.

In the information processing method and apparatus according to the present invention, in which information on at least some of the functions of a first device (node) reserved for use and identification information unique to a device (node) which has reserved at least some of the functions of the first device for use are stored, and in which reservation is made over a bridge in e.g., the IEEE 1394 serial data bus, a reserve owner can be found by a node of another bus connected to the bridge even if bus resetting has occurred in a bus connected to the reserve owner.

In the information processing method and apparatus according to the present invention, in which identification information unique to a second device (node) is written in a storage unit of a first device to be reserved for use, and in which reservation has been made over a bridge in e.g., the IEEE 1394 serial data bus, a reserve owner can be found by a node of another bus connected to the bridge even if bus resetting has occurred in a bus connected to the reserve owner.

In the information processing method and apparatus according to the present invention, in which reservation is made over a bridge in e.g., the IEEE 1394 serial data bus, a reserve owner can be found by a node of another bus connected to the bridge even if bus resetting has occurred in a bus connected to the reserve owner, by reading out from the storage unit of a first device information on at least some of the functions of the first device already reserved for use, and identification information unique to the device which has made the reservation for use.

In the information processing method and apparatus according to the present invention, in which reservation is made over a bridge in e.g., the IEEE 1394 serial data bus, a reserve owner can be found by a node of another bus connected to the bridge even if bus resetting has occurred in a bus connected to the reserve owner, by reading out from the storage unit of a first device information on at least some of the functions of the first device already reserved for use by a second device, and identification information unique to the second device, verifying whether a reservation for use of the first device by a third device is possible based on the information read out, and writing identification information unique to the third device in the storage unit of the first device.

BRIEF DESCRIPTION OF THE DRAWINGS

FIG. 5 illustrates typical examples of the positions, names and operations of the main CRS.

FIG. 6 illustrates typical examples of the general ROM format.

FIG. 7 illustrates typical examples of a bus information block, route directory and unit directory.

FIG. 8 illustrates typical examples of the PCR structures.

FIGS. 9A, 9B, 9C and 9D illustrate typical structures of oMPR, oPCR, iMPR and iPCR.

FIG. 12 illustrates typical examples of the descriptor data format.

FIG. 13 illustrates typical examples of the generation ID of FIG. 12.

FIG. 14 illustrates typical examples of the list IDs of FIG. 12.

FIG. 22 illustrates an AV/C response frame format.

FIG. 23 illustrates a command type.

FIG. 24 illustrates a subunit type.

FIG. 25 illustrates a subunit ID.

FIG. 26 shows an illustrative format of a reserve control command comprised of an array of EUI-64.

FIG. 27 shows another illustrative format of a reserve control command comprised of an array of EUI-64.

FIG. 28 illustrates the arrayed positions of the EUI-64 in a configuration ROM.

FIG. 29 illustrates the priority arrayed in the reserve control command.

FIG. 30 illustrates the format of a reserve status command.

FIG. 36 is a block diagram showing an illustrative structure of a computer.

DETAILED DESCRIPTION

Figure 1:
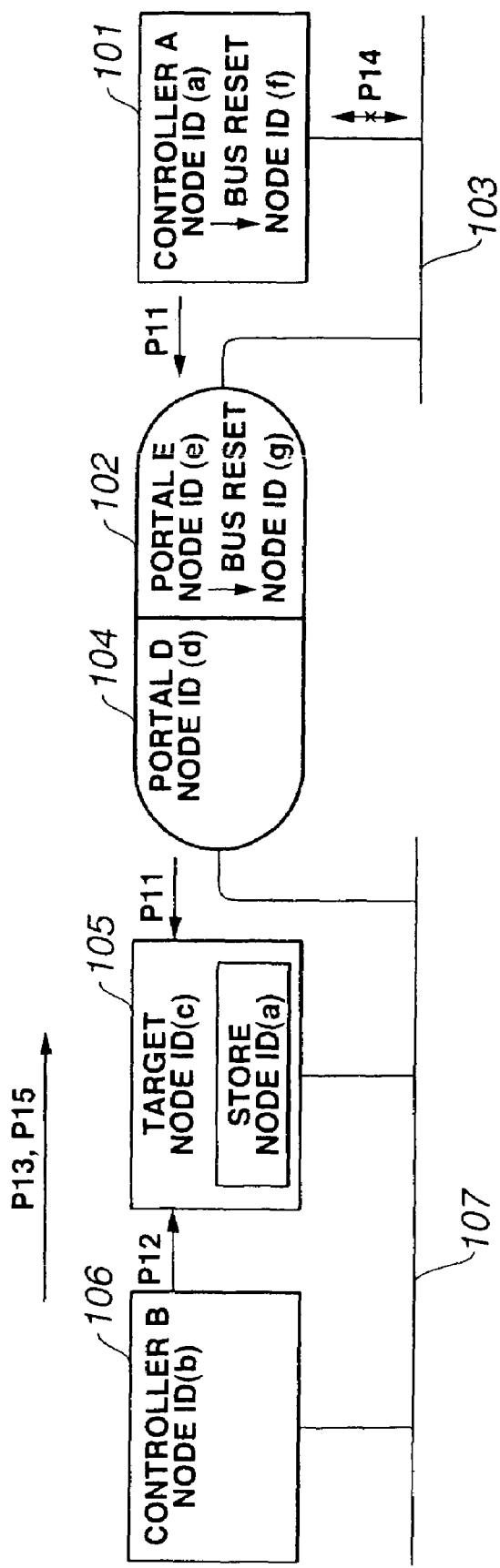
FIG. 1 is a schematic block diagram showing an illustrative structure of a conventional system connected over a bridge to the IEEE 1394 serial data bus.

Referring to the drawings, preferred embodiments of the present invention will be explained in detail.

First, an IEEE 1394 serial data bus used in the present embodiment is explained.

Figure 3:
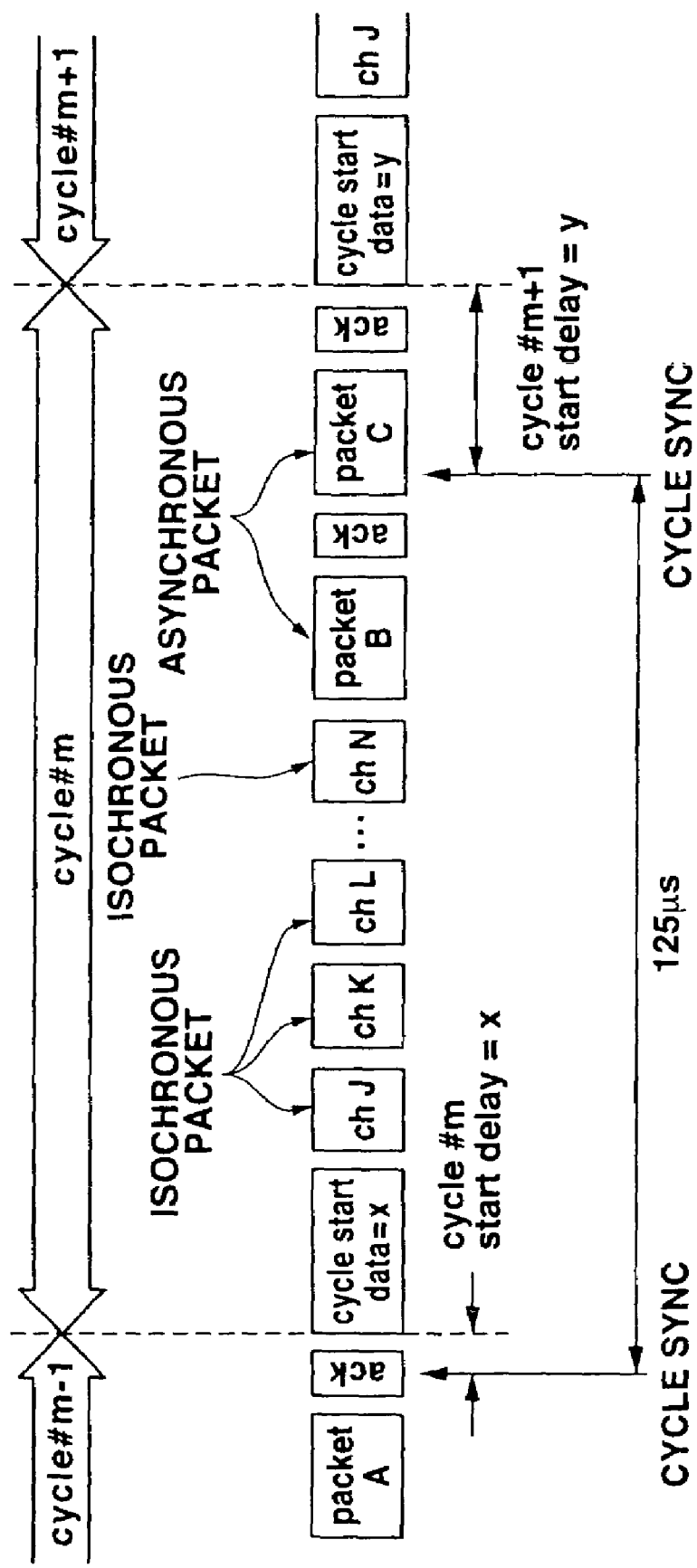
FIG. 3 illustrates a typical cyclic structure of data transmission over a bus of the IEEE 1394 serial data bus system.

FIG. 3 shows a cyclic structure of data transmission for equipment connected over the IEEE 1394 serial data bus. In the IEEE 1394 system, data is split into packets and transmitted time-divisionally with a 125 μsec cycle as a reference. This cycle is created by a cycle start signal supplied from a node having a cycle master function (any equipment connected to the bus). An isochronous packet acquires a band, so termed though it really means a temporal unit, necessary for transmission, from the initial portion of each cycle. Thus, isochronous transmission of data within a pre-set time duration is assured. However, should transmission errors occur, there is no protective structure, so that data is lost. In asynchronous transmission in which, during the time in each cycle not used for isochronous transmission, a node which has acquired the bus on arbitration sends out asynchronous packets, reliable transmission is assured by using acknowledge and retry. However, the transmission timing is not constant.

In order for a pre-set node to perform isochronous transmission, the node has to cope with the isochronous function. Moreover, at least one of the nodes, accommodating the isochronous function, needs to have the cycle master function. In addition, at least one of the nodes connected to the IEEE 1394 serial data bus needs to have the function of an isochronous resource manager.

Figure 4:
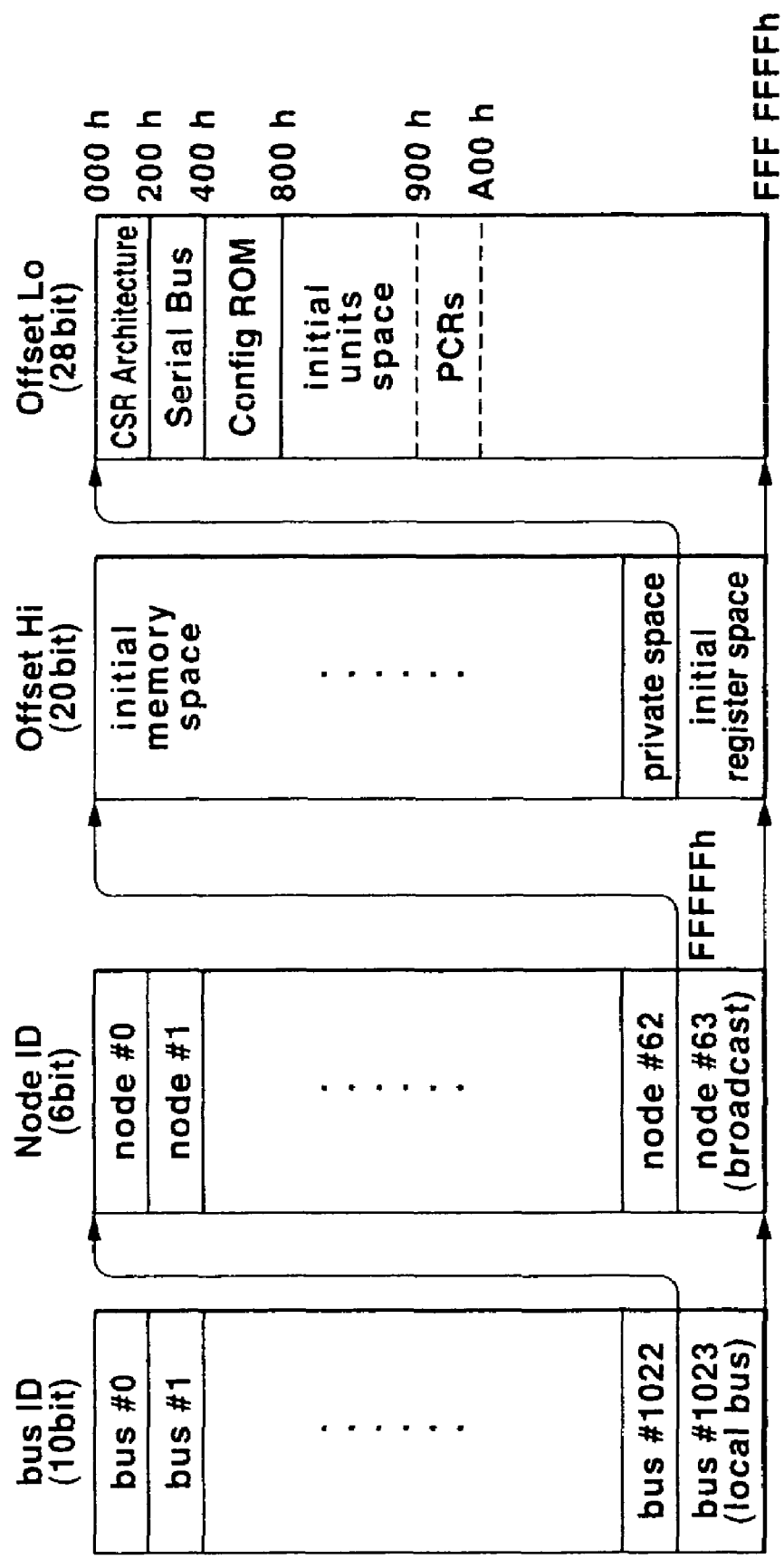
FIG. 4 shows an illustrative structure of an address space of a CRS architecture.

The IEEE 1394 system complies with the CSR (control & status register) architecture defined by the ISO/IEC 13213 standard for 64 bit fixed addressing. FIG. 4 shows the structure of the address space of the CSR architecture. The first 16 bits are node IDs representing the nodes on each IEEE 1394 bus, with the remaining 48 bits being used for specifying the address space afforded to the respective nodes. The first 16 bits are further divided into 10 bits for the bus ID and 6 bits for the physical ID (node ID in the narrow sense of the term). All bits being 1 represent a value used for a special purpose, such that 1023 buses and 63 nodes can be specified.

Of the 256 terabyte address space prescribed by the remaining 48 bits, the space prescribed by the initial 20 bits is split into an initial register space (Initial Register Space) used for 2048-byte CSR-peculiar register or a register peculiar to the IEEE 1394 standard, a private space (Private Space) and an initial memory space (Initial Memory Space).

If the space prescribed by the initial 20 bits is an initial register space, the space prescribed by the remaining 28 bits is used as a configuration ROM (read-only memory), an initial unit space (Initial Unit Space) used for a node-specific purpose, or as a plug control register (Plug Control Register (PCR).

FIG. 5 illustrates an offset address, name and the functions of main CSRs. An offset in FIG. 5 indicates an offset address relative to the FFFFF0000000h address at which the initial register space begins. It is noted that a number ending in h indicates that the number is a hexadecimal number. A bandwidth available register, having an offset of 220h, denotes a band that can be allocated to isochronous communication. The value of the node operating as an isochronous resource manager is valid, that is, although each node has a CSR architecture as shown in FIG. 4, the bandwidth available register in only the isochronous resource manager is recognized to be effective. Stated differently, only the isochronous resource manager has the bandwidth available register. A maximum value is assigned to the bandwidth available register if no band is assigned to isochronous communication. The value is decreased each time a band is assigned to isochronous communication.

In the channel available register (Channel Available Register) with an offset of 224h to 228h, the respective bits correspond to channel numbers from 0 to 63. The bit 0 means that the channel has already been assigned. The channel available register is effective only in the node operating as the isochronous resource manager.

Returning to FIG. 4, a configuration ROM (read-only memory) which is based on a general ROM format is arranged in addresses 200h to 400h in the initial register space. FIG. 6 illustrates the general ROM format. A node, which is a unit of access on the IEEE 1394 bus, may have a plurality of units operating independently while using a common address space in the node. The unit directories field (Unit Directories) can indicate the versions or positions of the software for these units. Although the positions of the bus information blocks (bus info blocks) and the root directory are fixed, the positions of the remaining blocks are specified by the offset addresses.

FIG. 7 shows details of the bus information block, root directory and unit directories. In the Company ID field in the bus info block, ID numbers indicating the makers of the apparatus are stored. The Chip ID field stores an ID unique to that apparatus and the only one ID in the world which does not overlap with any other IDs. In addition, 00h, Aoh and 2Dh are written in first, second and third octets, respectively, of the unit spec ID field (Unit spec id) of the unit directory of apparatus which meets the IEC 61883 standard. Furthermore, 01h is written in the first octet of the unit switch version (unit sw version) field, and 1 is written in the LSB (least significant bit)of the third octet.

For controlling the input/output of an apparatus via an interface, the node has a PCR (Plug Control Register) as prescribed by the IEC 61883 standard in the addresses 900h to 9FFh in the initial unit space of FIG. 4. This design embodies the concept of a plug substantial to form a signal route logically similar to an analog interface. FIG. 8 illustrates the structure of the PCR. The PCR has an OPCR (output Plug Control Register) representing an output plug and an iPCR (input Plug Control Register) representing an input plug. In addition, the PCR includes registers OMPR (output Master Plug Register) and iMPR (input Master Plug Register) indicating information on an output plug or an input plug unique to each apparatus. Although each apparatus does not have plural oMPRs or iMPRs, it is possible for each apparatus to have plural oPCRs and iPCRs corresponding to individual plugs, depending on the capabilities of the apparatus. The PCR shown in FIG. 8 includes 31 oPCRs and iPCRs, respectively. The flow of isochronous data is controlled by manipulating the registers associated with these plugs.

FIG. 9 shows the structures of an OMPR, oPCR, iMPR and iPCR. Specifically, FIGS. 9A, 9B, 9C and 9D show the structures of an OMPR, OPCR, IMPR and IPCR, respectively. A code indicating the maximum transmission rate of isochronous data that the apparatus can send or receive is stored in the 2-bit data rate capability field (data rate capability) on the MSB side of the OMPR and iMPR. A broadcast channel base field (broadcast channel base) in the OMPR defines the channel number to be used for broadcast output.

The 5-bit number of output plugs field on the LSB side of the OMPR stores a value showing the number of output plugs that the apparatus has, that is, the number of oPCRs. The 5-bit number of input plugs field on the LSB side of the iMPR stores a value showing the number of input plugs that the apparatus has, that is, the number of iPCRs. A non-persistent extension field and a persistent extension field are areas defined for future expansion.

An on-line field (on-line) on the MSB side of the oPCR and iPCR indicate a state of use of a plug. To be more specific, a value of 1 in the on-line field indicates that the plug is in an ON-LINE state, whereas a value of 0 in the on-line field indicates that the plug is in an OFF-LINE state. The values in the broadcast connection counter fields of both the OPCR and iPCR represent the presence (a value of 1) or absence (a value of 0) of a broadcast connection. The values in the 6-bit point-to-point connection counter fields (point-to-point connection counter) of both the OPCR and iPCR indicate the number of point-to-point connections that the plug has.

The values in the 6-bit channel number fields (channel number) in both the OPCR and iPCR indicate the number of the isochronous channel to which the plug is connected. The value in the 2-bit data rate field (data rate) in the oPCR indicates an actual transmission rate of packets of isochronous data output from the plug. The code stored in the 4-bit overhead ID field (overhead ID) in the OPCR indicates the band width over the isochronous communication. The value in the 10-bit payload field (payload) in the OPCR indicates the maximum value of the data contained in the isochronous packets that the plug can handle.

Figure 10:
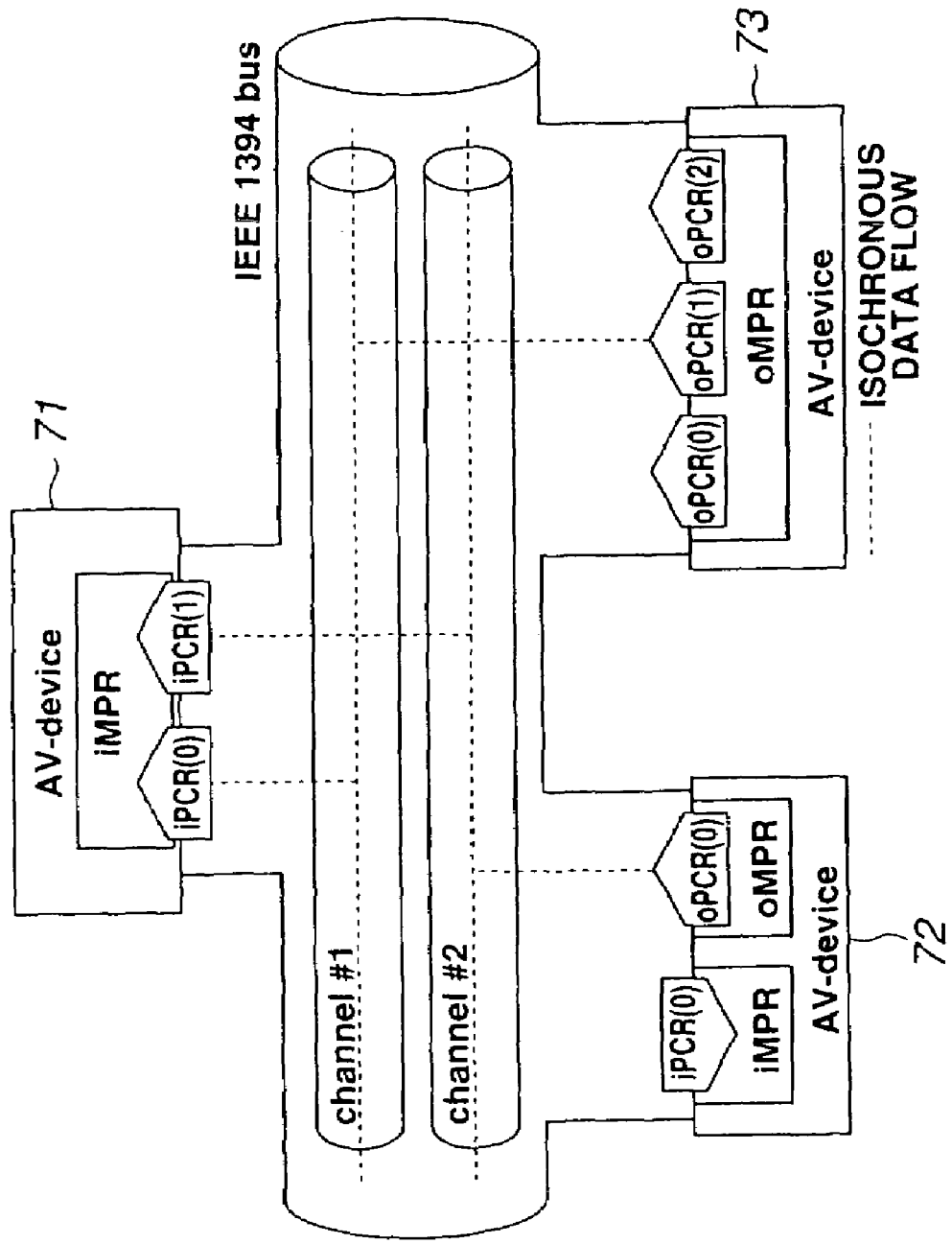
FIG. 10 illustrates the typical relation between plugs, plug control registers and transmission channels.

FIG. 10 shows the relationship among a plug, a plug control register and an isochronous channel. AV devices 71 to 73 are connected to each other by an IEEE 1394 serial data bus. The OMPR in the AV device 73 defines the number and transmission rate of the oPCR[0] to oPCR[2] in the device. The isochronous data, having a channel specified by the oPCR[1], is sent to channel #1 of the IEEE 1394 serial bus. The iMPR in the AV device 71 defines the number and transmission rate of the iPCR[0] and iPCR[1] therein. The AV device 71 reads the isochronous data sent to channel #1 of the IEEE 1394 serial bus as designated by the iPCR[0]. Likewise, AV device 72 sends isochronous data to channel #2 as specified by the oPCR[0], and AV device 71 reads the isochronous data to channel #2 as specified by the iPCR[1].

In accordance with the foregoing description, data transmission is executed among the apparatus connected to each other by the IEEE serial bus. In this system, each apparatus can be controlled and the state thereof can be determined by use of an AV/C command set defined as commands for controlling the apparatus connected to each other by the IEEE serial bus. This AV/C command set will now be explained.

Figure 11:
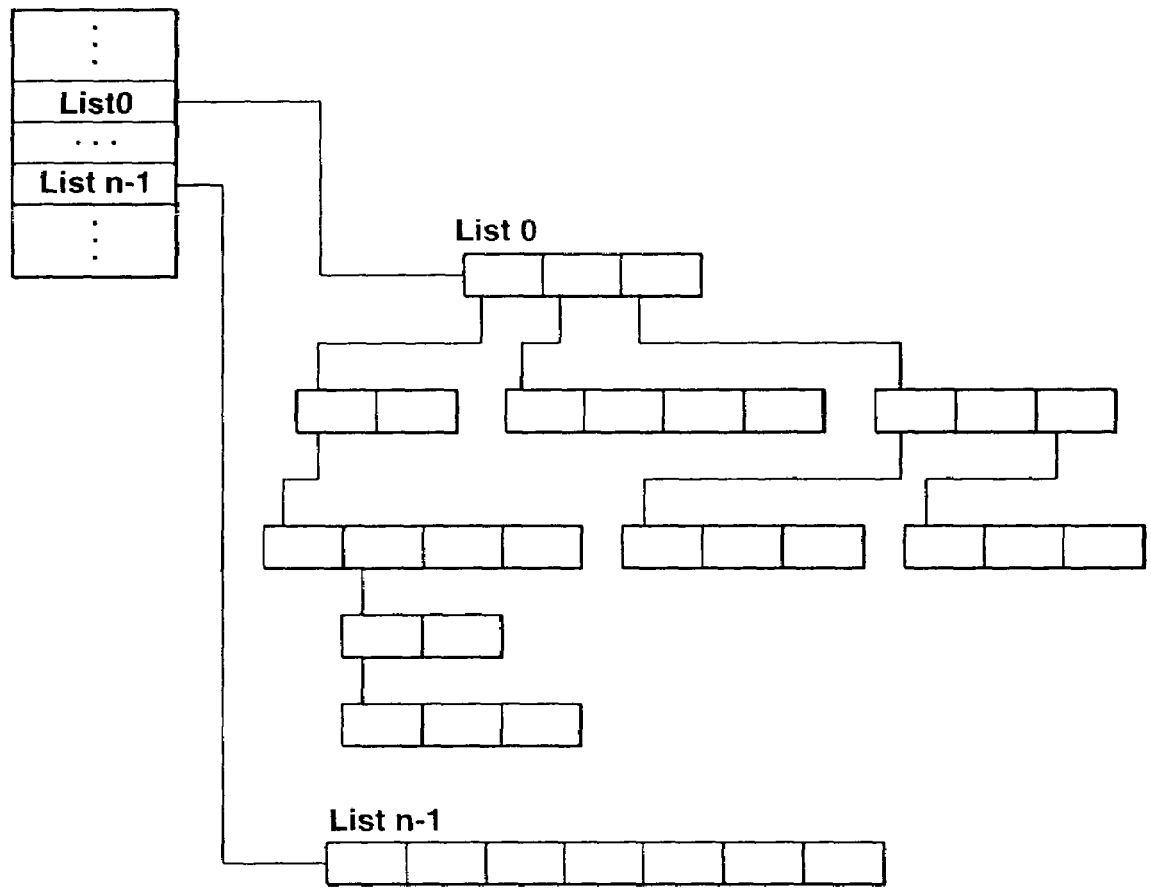
FIG. 11 illustrates typical data structures by the hierarchical descriptor structure.

First, a data structure of the Subunit Identifier Descriptor in the AV/C command set used in the system of this example will be described by reference to FIGS. 11 to 14. FIG. 11 shows the data structure of the Subunit Identifier Descriptor. As shown in FIG. 11, the data structure of the Subunit Identifier Descriptor consists of hierarchical lists. For instance, if the AV apparatus is a tuner, a list represents channels through which data can be received, and if the AV apparatus is a disc, a list represents music recorded thereon. The list in the uppermost layer of the hierarchical structure is called a root list; for instance, list 0 is a root for its subordinate lists. Lists 2 to (n−1) are also root lists. There are as many root lists as there are objects. If the AV apparatus is a tuner, the objects are the channels in a digital broadcast. All of the lists of one layer share the same information.

FIG. 12 shows a format of the General Subunit Identifier Descriptor used in an existing system. A Subunit Identifier Descriptor has contents including attribute information on functions. The generation ID field indicates the version of the AV/C command set, the value of which is currently "00h" (h represents hexadecimal) as shown in FIG. 13. Here, "00h" means the data structure and command set are version 3.0 of AV/C General Specification. In addition, as shown in FIG. 13, all the values except "00h" are reserved for future specification.

The size of list ID field indicates the number of bytes of the list ID. The size of object ID field indicates the number of bytes of an object. The size of object position field indicates the position (the number of bytes) in the lists to be referenced in a control operation. The number of root object lists field indicates the number of root object lists. The root object list ID field indicates an ID for identifying the uppermost root object list in the independent layers in the hierarchy.

The subunit dependent length field indicates the number of bytes in a subsequent subunit dependent information field. The subunit dependent information field indicates information unique to the functions. The manufacturer dependent length field indicates the number of bytes in a subsequent manufacturer dependent information field. The manufacturer dependent information field indicates specification information of a vendor (a manufacturer). In the case where there is no manufacturer dependent information in the descriptor, this field does not exist.

FIG. 14 indicates the assignment ranges of the list ID shown in FIG. 12. As shown in FIG. 14, the values at "0000h to 0FFFh" and "4000h to FFFFh" are reserved for future specification. The values at "1000h to 3FFFh" and "10000h to max list ID value" are provided for identifying information of a function type.

Figure 15:
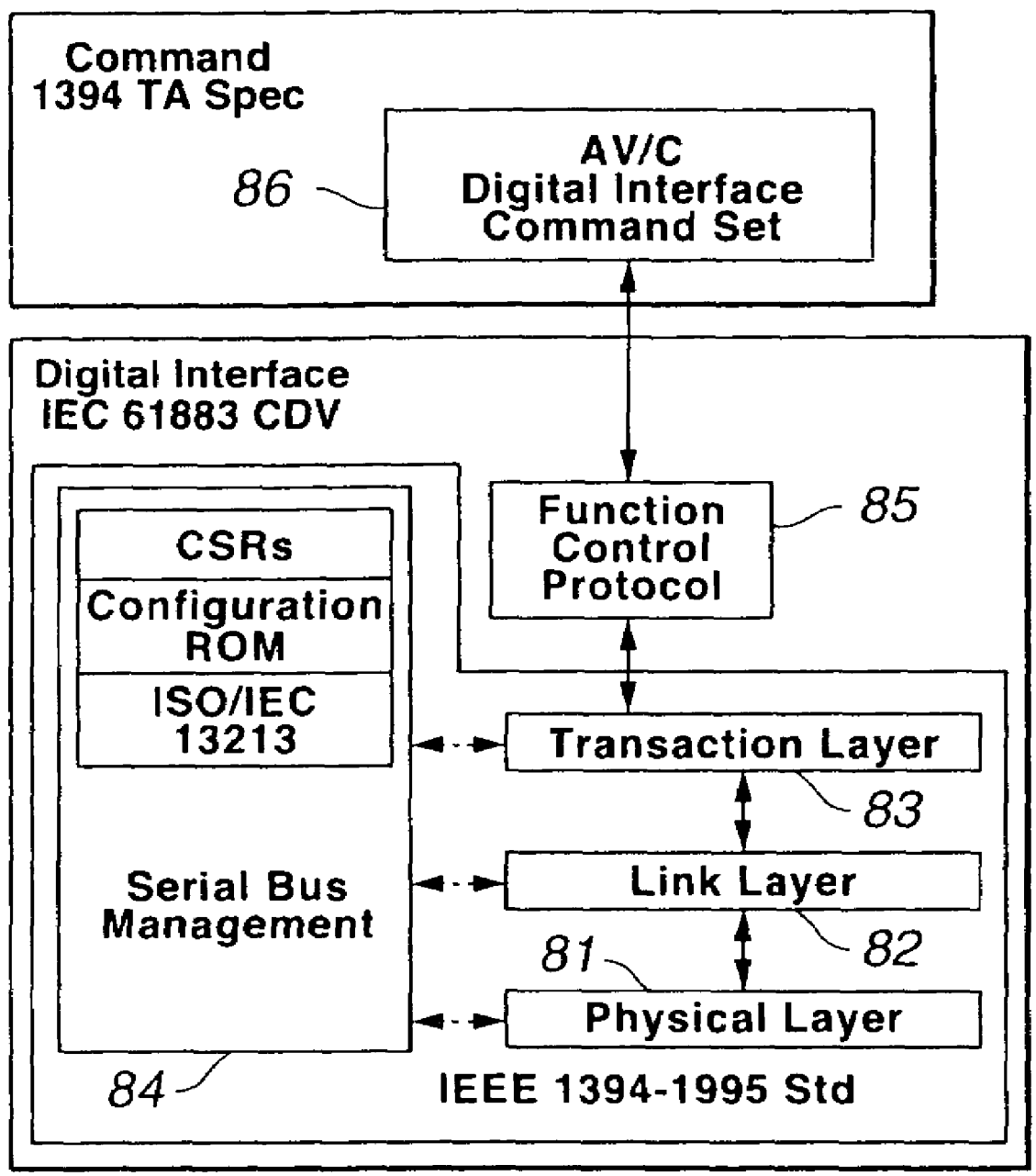
FIG. 15 illustrates a typical AV/C command stack model.

Next, the AV/C command tset used in the system of this example will be described by referring to FIGS. 15-17. FIG. 15 shows a stack model of the AV/C command set. As shown in FIG. 15, a physical layer 81, a link layer 82, a transaction layer 83 and a serial bus management 84 are in compliance with the IEEE 1394 standard. An FCP (Function Control Protocol) 85 is in compliance with the IEC 61883 standard. An AV/C command set 86 is in compliance with the 1394 TA specification.

Figure 16:
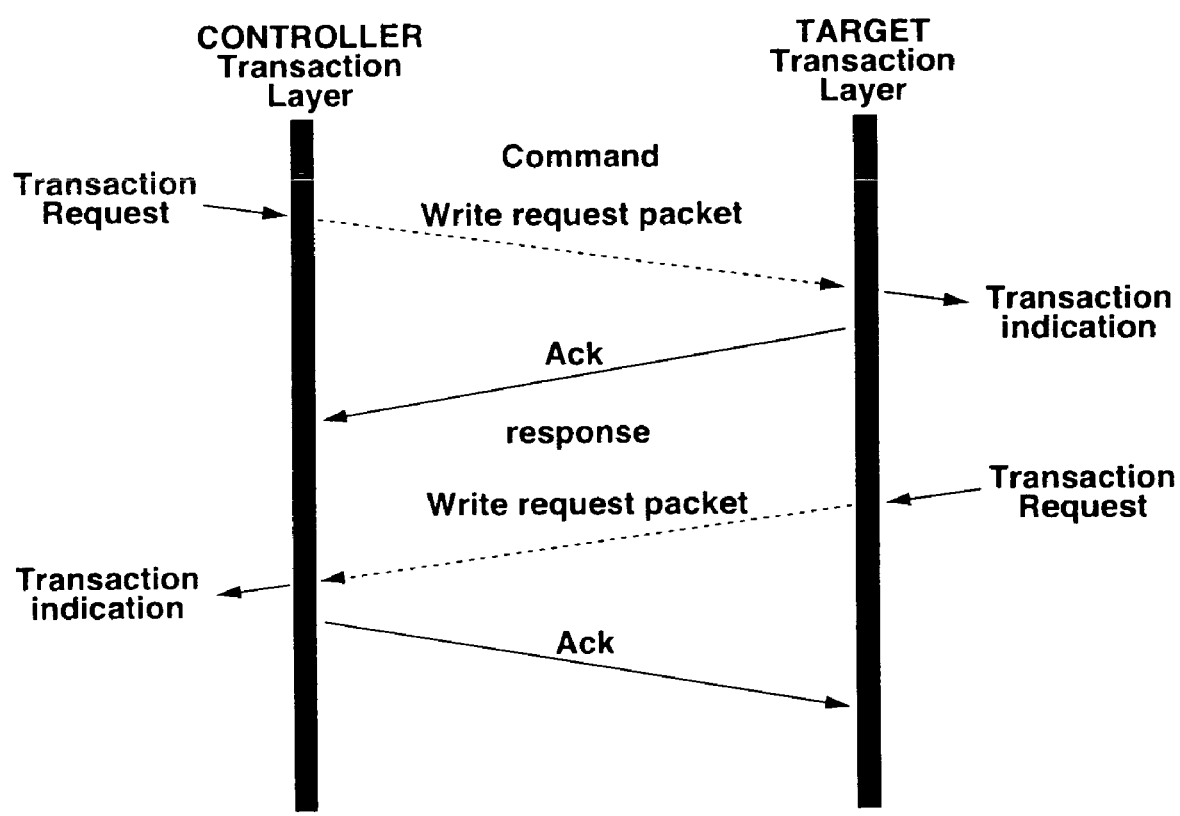
FIG. 16 illustrates the relation between the FCP command and the response.

FIG. 16 illustrates a command and a response of the FCP 85 of FIG. 15. The FCP is a protocol for controlling the AV apparatus in conformance with the IEEE 1394 standard. As shown in FIG. 16, the controlling side is a controller and the controlled side is a target. In the FCP, a command is sent and received between nodes by using the write transaction in the IEEE 1394 asynchronous communication. Upon receiving data from the controller, the target returns an acknowledgement to the controller to confirm receipt.

Figure 17:
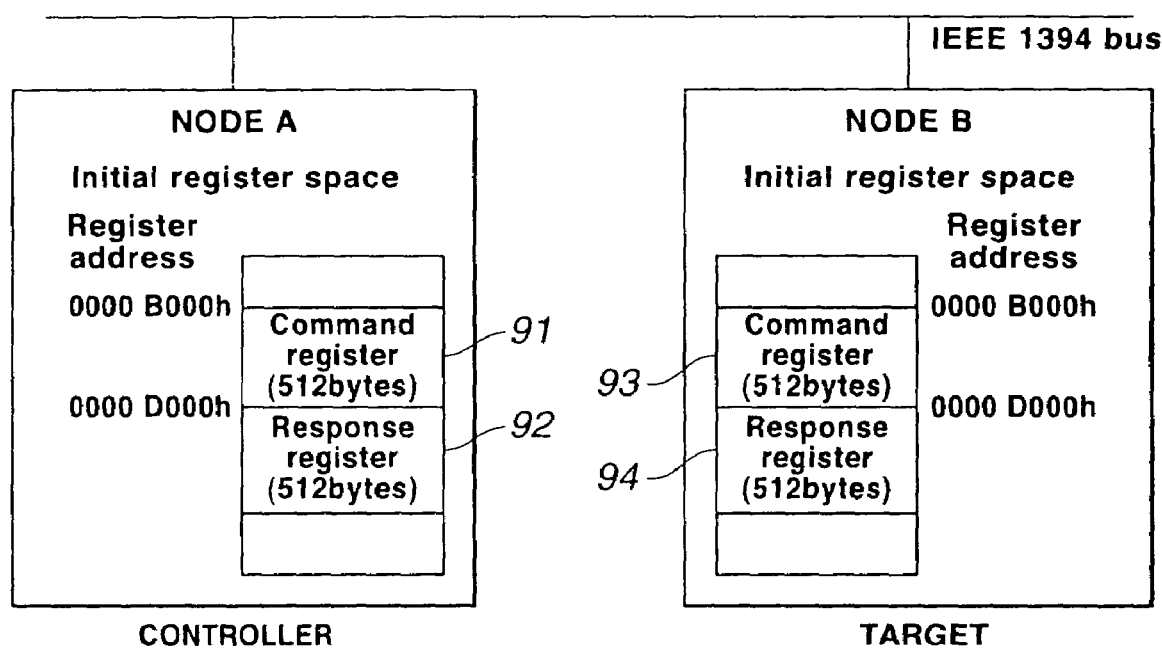
FIG. 17 illustrates the relation between the command and the response of FIG. 16.

FIG. 17 illustrates, in more detail, the relationship between a command and a response of the FCP as shown in FIG. 16. Node A and B are connected via an IEEE 1394 bus. Node A is a controller and node B is a target. Both node A and node B have a command register and a response register of 512 bytes, respectively. As shown in FIG. 17, the controller writes a command message to a command register 93 in the target to convey a command thereto. Conversely, the target writes a response to the response register 92 in the controller to convey a response. In response to these two messages, control information is exchanged. The type of the command set sent by the FCP is written in the CTS in a data field shown in FIG. 20.

Figure 18:
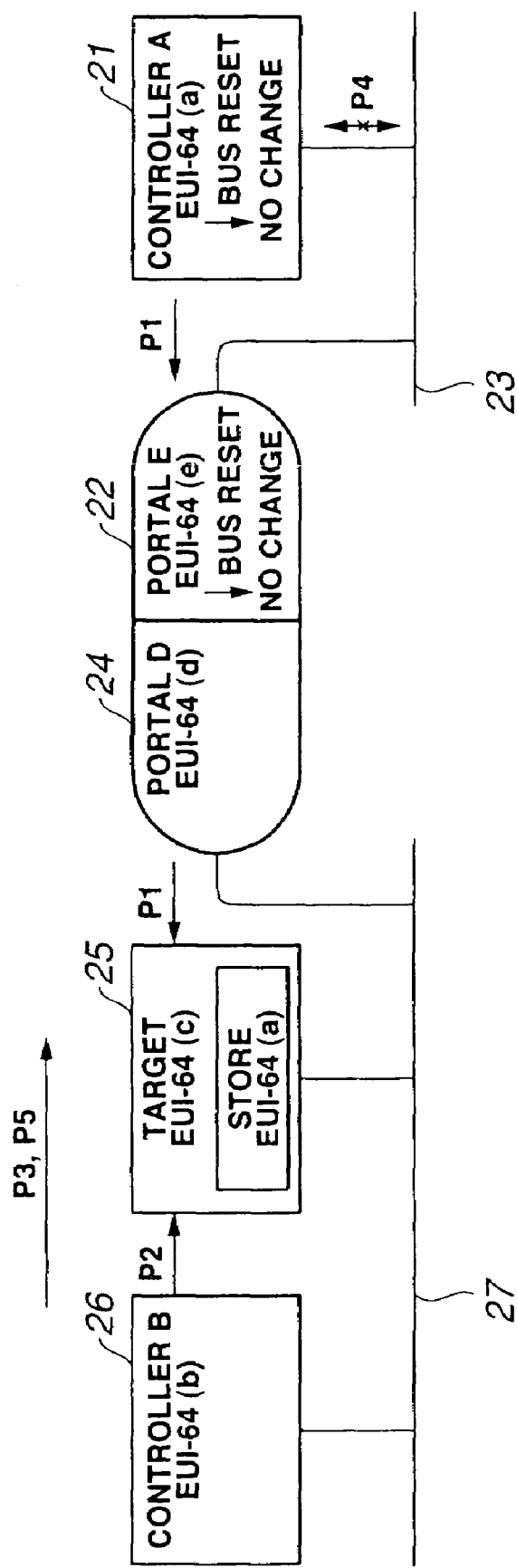
FIG. 18 is a schematic block diagram showing an illustrative structure of a system in which the IEEE 1394 serial data buses are interconnected over bridges according to an embodiment of the present invention.

FIG. 18 shows an illustrative structure of the present embodiment in which the IEEE 1394 serial data buses are interconnected by bridges.

In this figure, nodes 21, 22 are connected to the IEEE 1394 serial data bus 23, whilst nodes 24 to 26 are connected to the IEEE 1394 serial data bus 27. In the embodiment of FIG. 18, nodes 22, 24 represent portals. The nodes 22, 24 are referred to below as portals E and D, respectively. These portals make up a bridge interconnecting the buses 23, 27. The nodes 21, 26 are controllers capable of reserving other equipment. The nodes 21, 26 are referred to below as a controller A and a controller B, respectively. The node 25 is a target reserved by the controller.

In the present embodiment, an EUI (Extended Unique Identifier) 64 is used, in addition to or in place of the node ID explained with reference to FIG. 1 for identifying the respective nodes being reserved. Although not explained in detail, this EUI-64, also termed GUID (Global Unique Identifier), is the identification information uniquely accorded to each node without regard to the bus structure or bus resetting. In the embodiment of FIG. 18, the EUI-64(*a*), EUI-64(*b*), EUI-64(*c*), EUI-64(*d*) and EUI-64(*e*) are accorded to the controller A, controller B, target, portal D and portal E, respectively.

Figure 19:
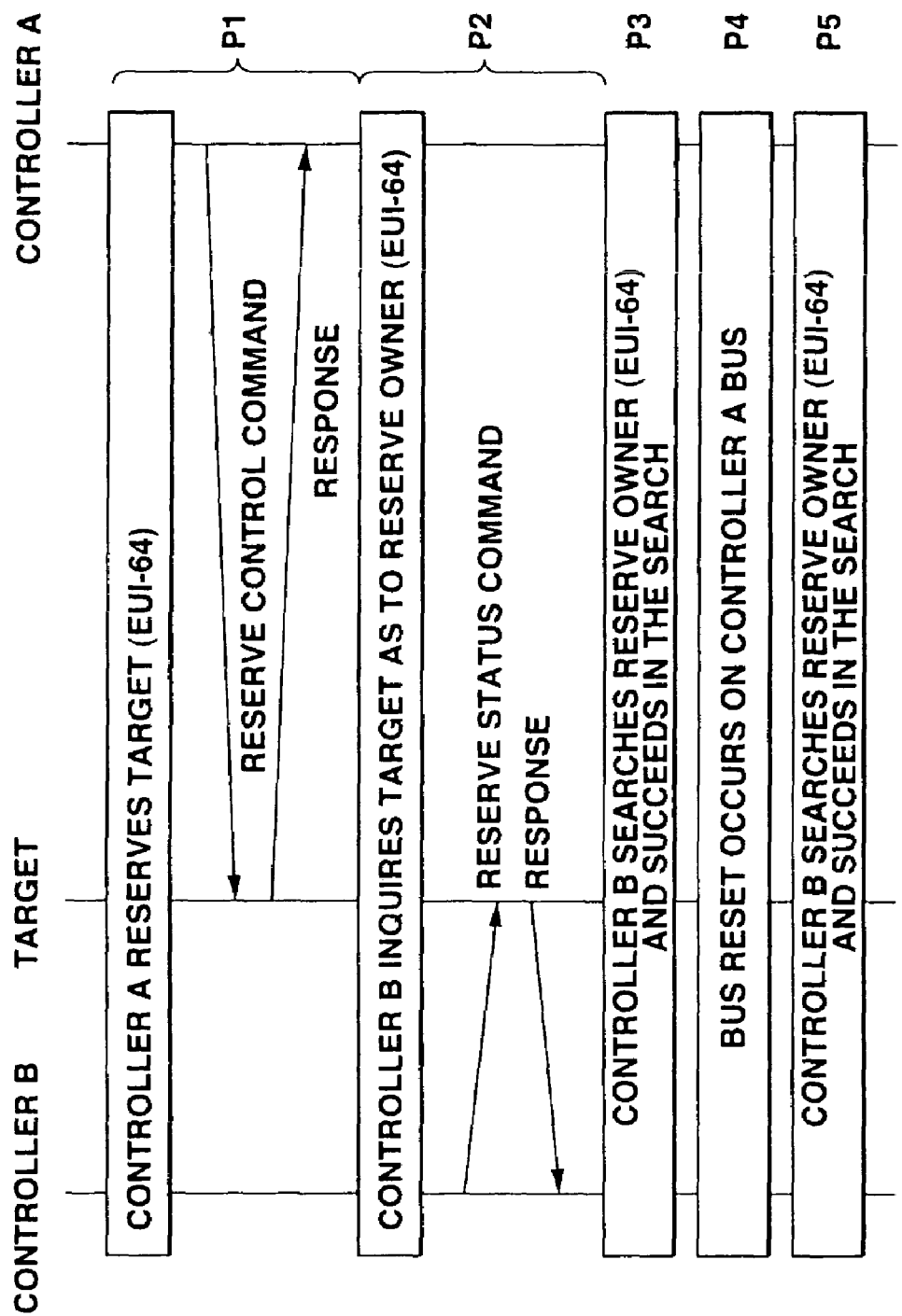
FIG. 19 illustrates the flow in case the controller A of FIG. 1 reserves a target and the controller B is searching for the reserve owner who has reserved the target.

In the present embodiment, the flow where the controller A reserves a target and the controller B searches for the reserve owner who has reserved the target is as shown in FIG. 19.

As a procedure P1, the controller A sends a reserve control command (RESERVE control command) prescribed as the AV/C command to the target (node 25) to reserve the target. The target, so reserved, returns a response to the controller A, while memorizing the EUI-64 of the node who has reserved it, here the EUI-64(*a*) of the controller A.

As the next procedure P2, the controller B sends a reserve status command (RESERVE status command) to the target to inquire as to the identity of the reserve owner. This inquiry is made by searching the EUI-64 of the reserve owner memorized by the target. Since the reserve owner at this time point is the controller A, the target notifies the controller B of the EUI-64(*a*) of the controller A.

The controller B may now be advised, in a procedure P3, that the controller A is the reserve owner.

It is now assumed that, in the embodiment of FIGS. 18 and 19, bus resetting has occurred between the controller A and the bus 3 in a procedure P4.

Figure 2:
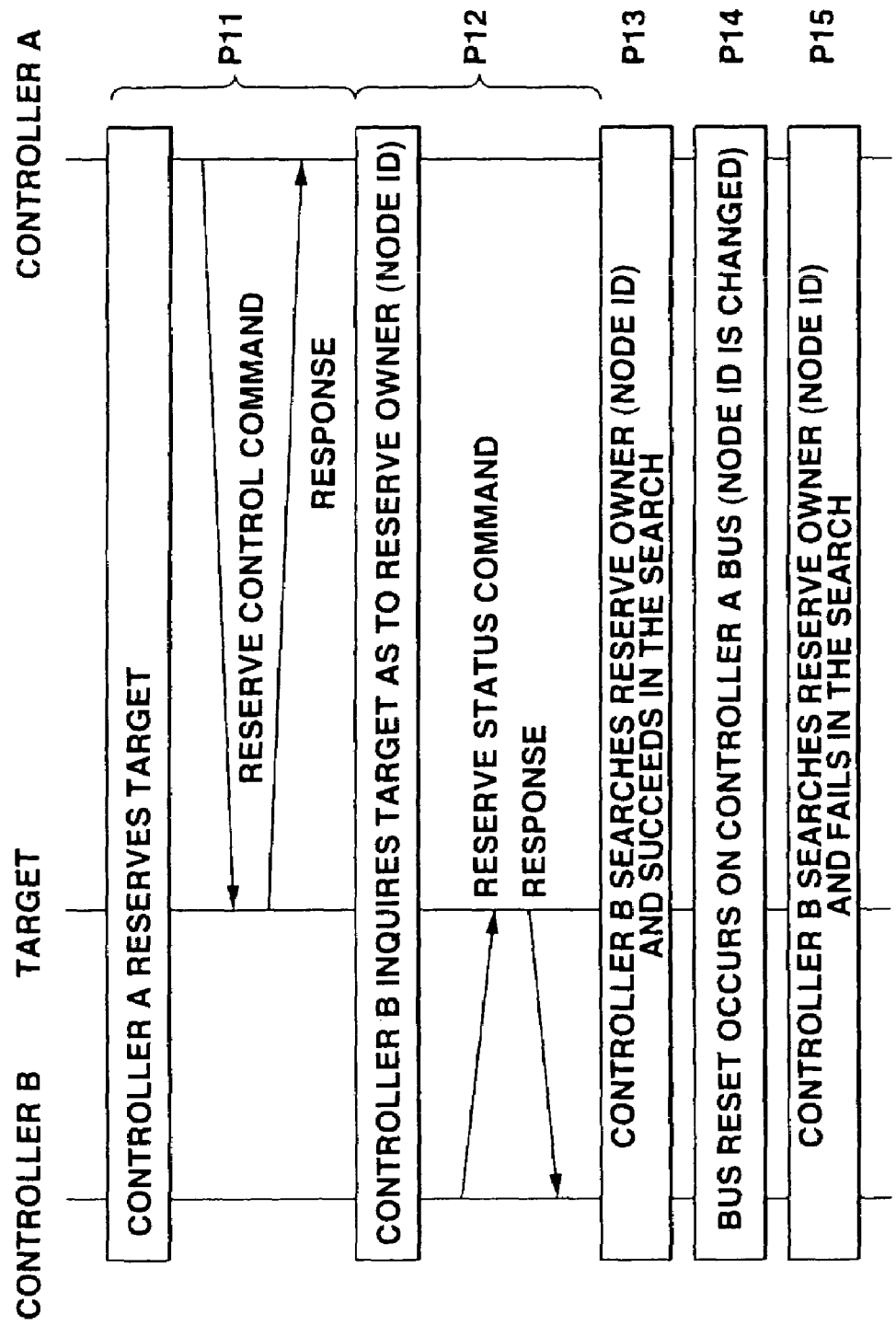
FIG. 2 illustrates the flow when the controller A reserves a target and a controller B searches for the reserve owner reserving the target.

In the embodiment of FIGS. 1 and 2, should bus resetting have occurred, the node ID of the node connected to the bus is updated. Thus, the controller B is unable to find that the reserve owner is the controller A. However, since the reserve owner is identified as the node having the unique EUI-64, the controller B is able to determine that the reserve owner is the controller A by finding out that the EUI-64(*a*) is stored in the target.

That is, in the present embodiment, identification is made by using the EUI-64 unique to each node so that, even when a reserving operation is made via a bridge, and bus resetting has occurred in the bus connected to the reserve owner, the node of another bus connected to the bridge is able to determine the identity of the reserve owner.

The controller B then verifies whether or not the use of a certain function of a target can be reserved. If the result is affirmative, the function is reserved.

In the foregoing description, it is assumed that, in reserving a target by the controller B, an inquiry to the target is first made as to the EUI-64 of the reserve owner. It is, however, also possible to first make an inquiry into the node ID of the reserve owner and, should the reserve owner not be identified because the node ID has been changed due to bus resetting, to then make an inquiry as to the reserve owner using the EUI-64. By so doing, it is possible to maintain compatibility even if an old version of equipment that is only able to reserve a node with the aid of the node ID is connected to the network.

The reserve command in the AV/C general specification will now be explained.

Figure 20:
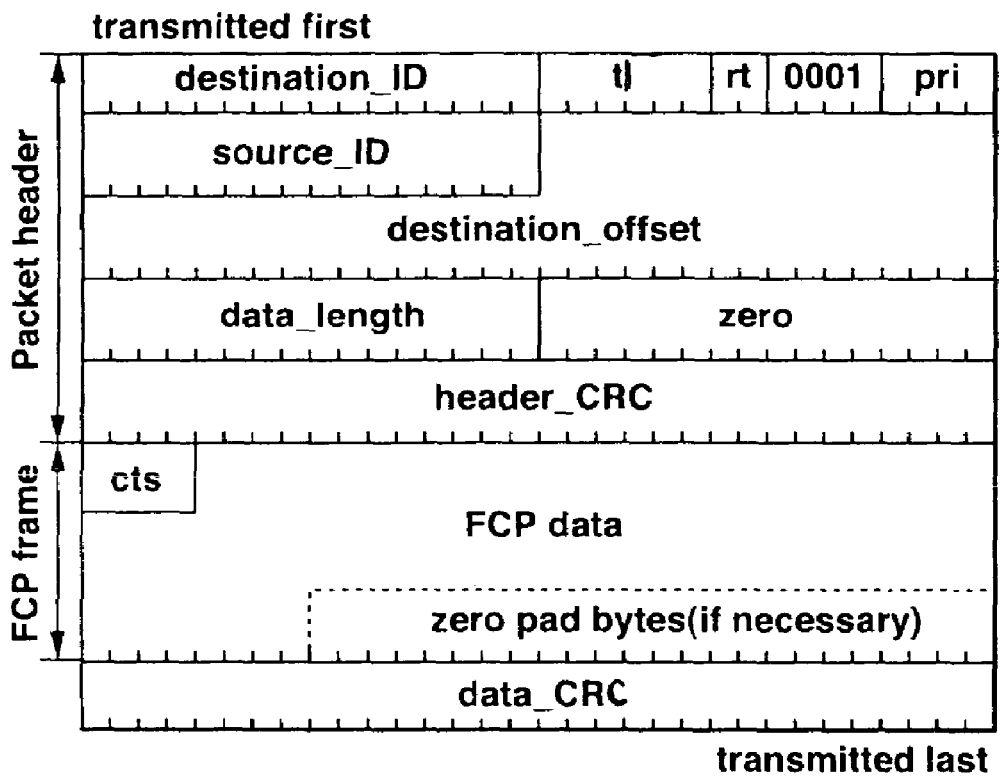
FIG. 20 illustrates the format of an FCP frame.

The reserve command and the response associated therewith are prescribed as a type of command and response of the AV/C general specification The command and the response of the AV/C general specification are transmitted by the FCP (Function Control Protocol) provided for in the IEC-61883 standard. The FCP encapsulates the command response controlling an apparatus in an asynchronous block write transaction of the IEEE standard 1394 1995. FIG. 20 shows the format for the FCP.

Referring to FIG. 20, the leading end is a packet header, followed by an FCP frame. At the trailing end, data CRC (data_CRC) is arranged.

At the leading end of the packet header, a destination ID (destination_ID) is arranged. This destination ID (destination_ID) denotes the ID of the node to which this packet is transferred. In FIG. 20, t1 means a transaction label (Transaction label) and denotes a unique tag appended from a node to a packet, while rt means a retry code (Retry code) representing a code pertinent to retry.

In FIG. 20, tcode denotes a transaction code (Transaction code) and, in the present embodiment, has a value of 0001, which means that the present block is a write request for a data block.

In FIG. 20, pri denotes a priority. By this value, arbitration occurs in a link layer.

The source ID (source_ID) denotes the ID of the node sending out the packet. The destination offset (destination_offset) denotes the address of a register in which the command or the response for this packet is written.

In FIG. 20, a data length (data_length) denotes the data length in the data field. In the next two bytes, values 0 are written. The last header CRC (header_CRC) denotes an error correction code in the packet header.

Figure 21:
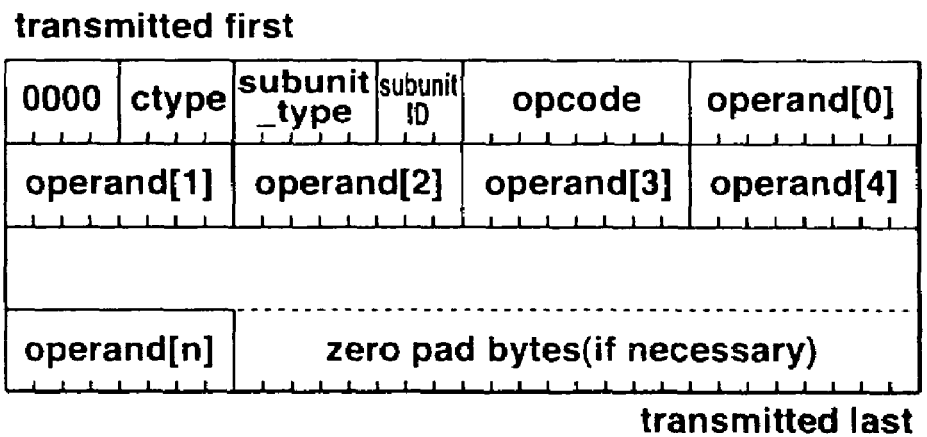
FIG. 21 illustrates an AV/C command frame format.

In an FCP frame of a payload part, the CTS (Command/Transaction Set) is arranged as the first four bits. This CTS has a value of 0000 for the AV/C transaction. The FCP data then is arranged. This FCP data is shown in detail in FIGS. 21 and 22. FIGS. 21 and 22 show an FCP frame of an AV/C command frame and an AV/C response frame, respectively.

In FIG. 22, ctype means a command type (Command type). The values prescribed therein have the meaning as shown in FIG. 23. That is, the value 0 denotes control (CONTROL) and the value 1 denotes status (STATUS).

The subunit type (subunit_type) denotes the sort of the subunit being considered by the command as shown in FIG. 24. The value 0 and the value 3 of the code denotes that the subunit type is a video monitor and that the subunit type is a disc recorder or player, respectively.

The subunit ID (subunit ID) is used as an instance number in case an extension subunit type has been defined. As shown in FIG. 25, the values 0 to 4 denote an instance number and the value 5 denotes that the subunit ID has been expanded to the next byte.

The opcode in FIG. 21 denotes an operation code (Operation code) and, in the case of reserving explained in the present embodiment, has a value of 01, as shown in FIG. 26. The opcode is followed by an operand [0] (operand [0]) to an operand [n] (operand [n]). In the operand [0] is arranged a priority. The value 0 of this code indicates that none of the controllers has reserved the node. The values 1 to F of this code denote that the target has the reservation (Reservation) for the controller. The value 4 of the priority is a standard priority used by a controller. The text is arranged in the operands [1] to [12] (operands [1] to [12]). In the text portion are inserted up to 12 bytes of ASCII letters or characters.

In the present embodiment, there are provided eight operands [13] to [20] (operands [13] to [20]). In these eight operands [13] to [20], the aforementioned EUI-64 is arranged, alternatively, the EUI-64 may also be arranged in the eight operands [1] to [8] (operands [1] to [8]), as shown in FIG. 27. Specifically, the EUI-64 is comprised of node_vendor_id (24 bits), chip_id_hi (8 bits) and chip_id_lo (32 bits), totaling 64 bits. These 64 bits of the EUI-64 are partitioned from the leading end at intervals of eight bits and arranged in the eight operands of the reserve command. Meanwhile, the node_vendor_id (24 bits) is also termed company ID (company_ID) while chip_id_hi (8 bits) and chip_id_lo (32 bits), totaling 40 bits, represent a serial number guaranteed by the IEEE RAC (Registration Authority Committee). As shown in FIG. 28, the aforementioned EUI-64 is recorded in "FFFF F000 040C$_{16}$" to "FFFF F000 0410$_{16}$" representing the address of node_vendor_id (24 bits), chip_id_hi (8 bits) and chip_id_lo (32 bits). The information stored in other addresses of the configuration ROM is already known and hence is not explained specifically.

On the other hand, the target in a free state, that is, in a non-reserved state, is reserved by a controller which has issued the reserve control command. The target memorizes the reserved priority, annexed text string, 16-bit node ID and the EUI-64 of the controller.

When the priority value is accepted by a target, the value to be held is converted as shown in FIG. 29. For example, the values of 0 and 1 are held as priority. The values of from 2 to E (hexadecimal number) are held as priority and E values. The value of F is held as the priority.

In holding the reservation of a pre-set controller, the target node rejects controller commands other than the reserving of the command type of the control (control) issued by other controllers.

If a reserve control command is received from the same controller as holding the reservation, such command is accepted. This allows the original controller to raise or lower the priority accompanying the reservation.

If a reserve control command is received from a controller other than the controller which has made the reservation, the target rejects the command unless the priority thereof is higher than that of the current reservation. If the new priority is higher than the current priority, a new reservation is established.

If a reserve control command is issued to an AV unit having a subunit holding a reservation of a higher priority, the reserve control command returns a reject (rejected) response.

If the reserve control command is issued to an AV unit not containing a subunit having an equal or higher priority, the reservation is established.

If a control command is issued to a subunit in the AV unit reserved by a controller other than the controller which has issued the controller command, the controller command is rejected.

On detection of a bus resetting, an AV unit resets the priority of the reservation to 0, while setting the reservation node ID and the reservation text all to 1. The AV unit rejects all commands of the command type of the control (control), excluding a reserve command, until the reservation is established or 10 seconds have elapsed. This procedure allows a holder of an original reservation to re-establish the reservation after the bus resetting.

Each controller does not issue a reserve control command within 10 seconds of the bus resetting, except if the reservation has been established to a target prior to bus resetting. Since the node ID of the AV unit is changed after the bus resetting, the controller desiring to establish the reservation checks for the EUI-64 which is the node unique ID.

In this situation, the target assumes that the reserve command received within 10 seconds of the bus resetting is correct to accept the reservation.

The controller may request the status of the current reservation by issuing a reserve command having a field of the command type of the status shown in FIG. 30.

The AV/C response frame, shown in FIG. 22, is configured similarly to the AV/C command frame shown in FIG. 21. However, a response (response) is arranged in place of ctype of FIG. 21. This response means a response code (response code), with its values 0 to F having the meaning shown in FIG. 31. For example, the value 8 means not being adapted to the requested command (NOT IMPLEMENTED), while the value 9 means that the requested command has been accepted (ACCEPTED). The value A means that the corresponding command has been rejected (REJECTED).

Figures 31, 32:
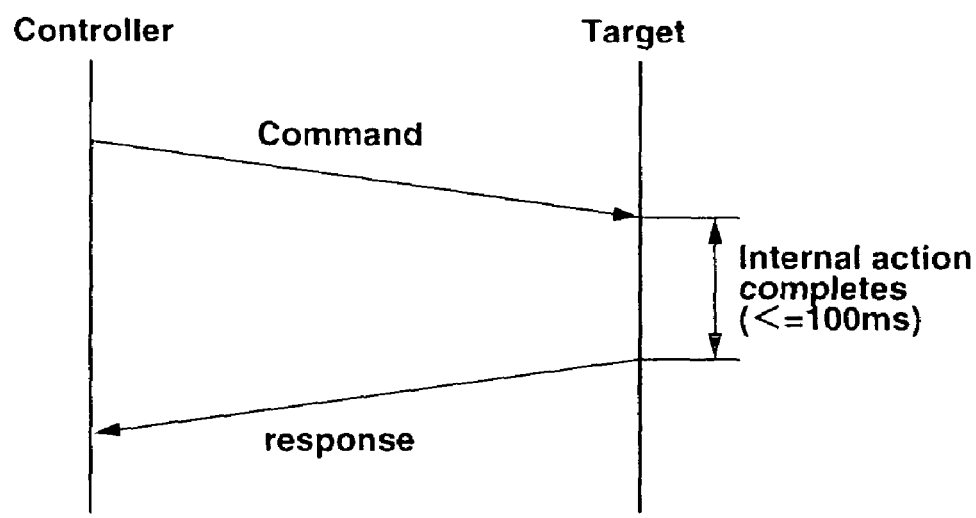
FIG. 31 illustrates a response code.
FIG. 32 illustrates prompt transactions of AV/C.

Referring to FIG. 32, if a controller has issued an AV/C command to a target, which is able to issue a response to the command within 100 ms, the target issues the response.

Figure 33:
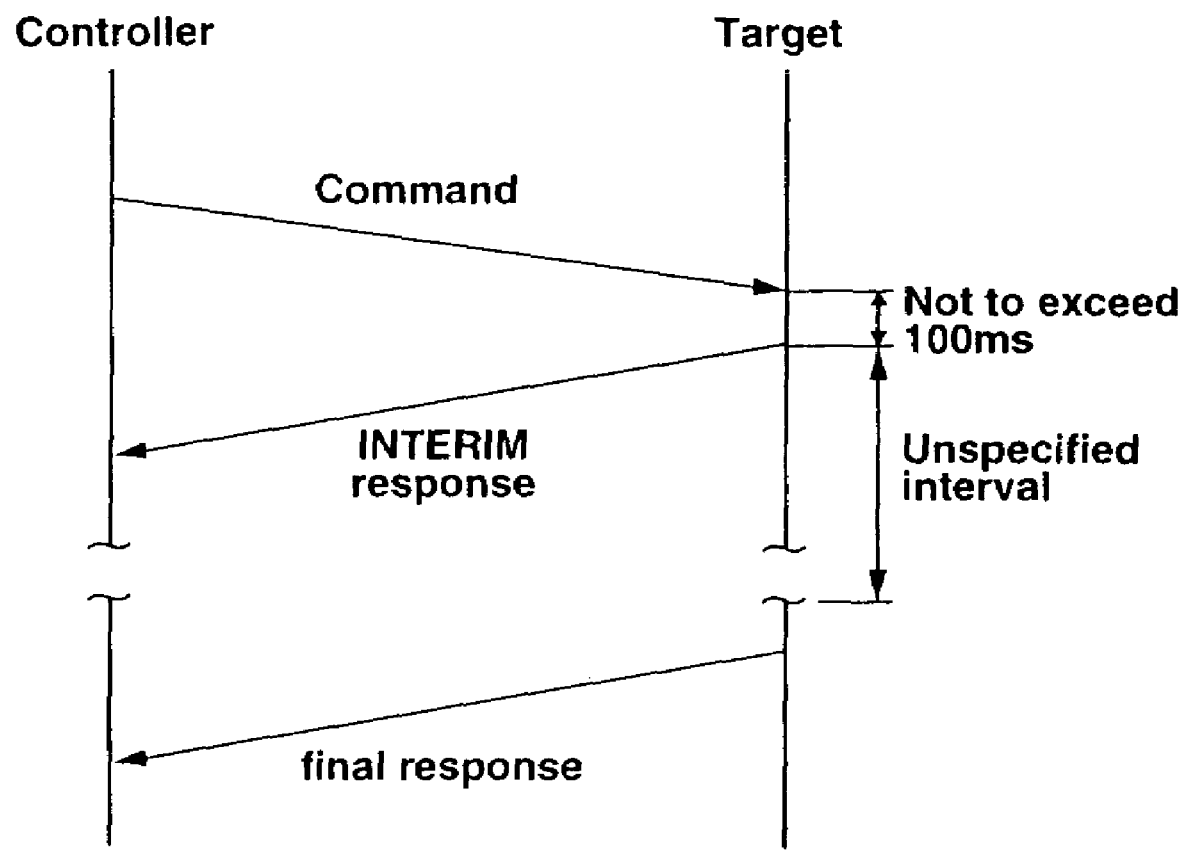
FIG. 33 illustrates delayed transactions of AV/C.

If, after receiving the command (Command), the corresponding processing cannot be completed within 100 ms, as shown in FIG. 33, an INTERIM response is issued before 100 ms has elapsed. Then, at a time point of completion of the processing, the target issues a final response (final response).

Figure 34:
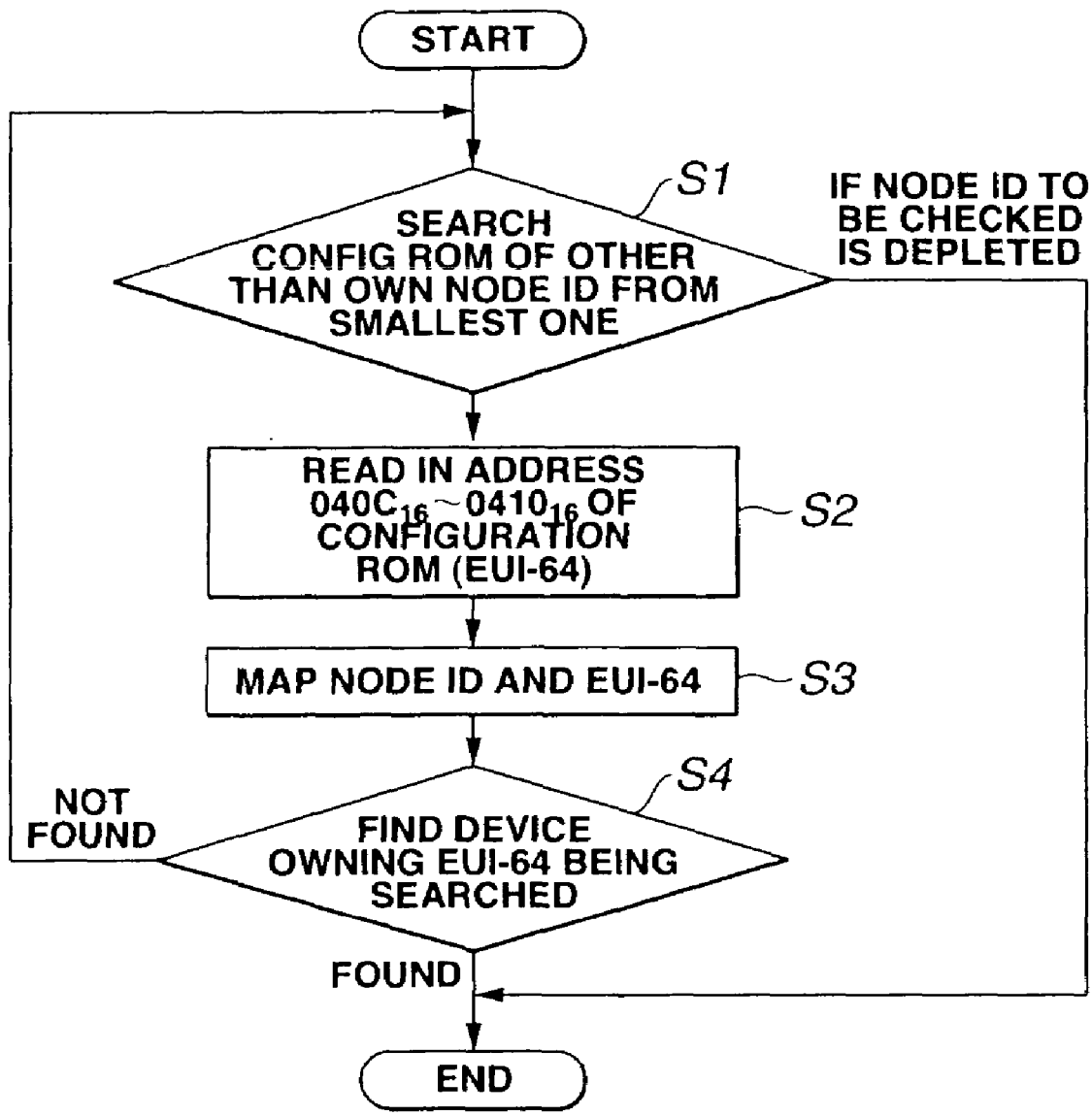
FIG. 34 is a flowchart used for explanation of the processing method in finding a reserve owner.

FIG. 34 shows a flow of processing for finding a reserve owner. In researching a reserve owner in the present embodiment, a search is made at step S1 in the configuration ROM beginning from the smallest one. At the next step S2, FFFF F000 $0410_{16}$" is read from the configuration ROM address "FFFF F000 $040C_{16}$".

At the next step S3, mapping is made between the node ID and the EUI-64 to find a device having the EUI-64 being searched for. If it is decided that the device cannot be found, the program reverts to step S1. If the device is found, the EUI-64 is taken out as the EUI-64 of the reserve owner.

Figure 35:
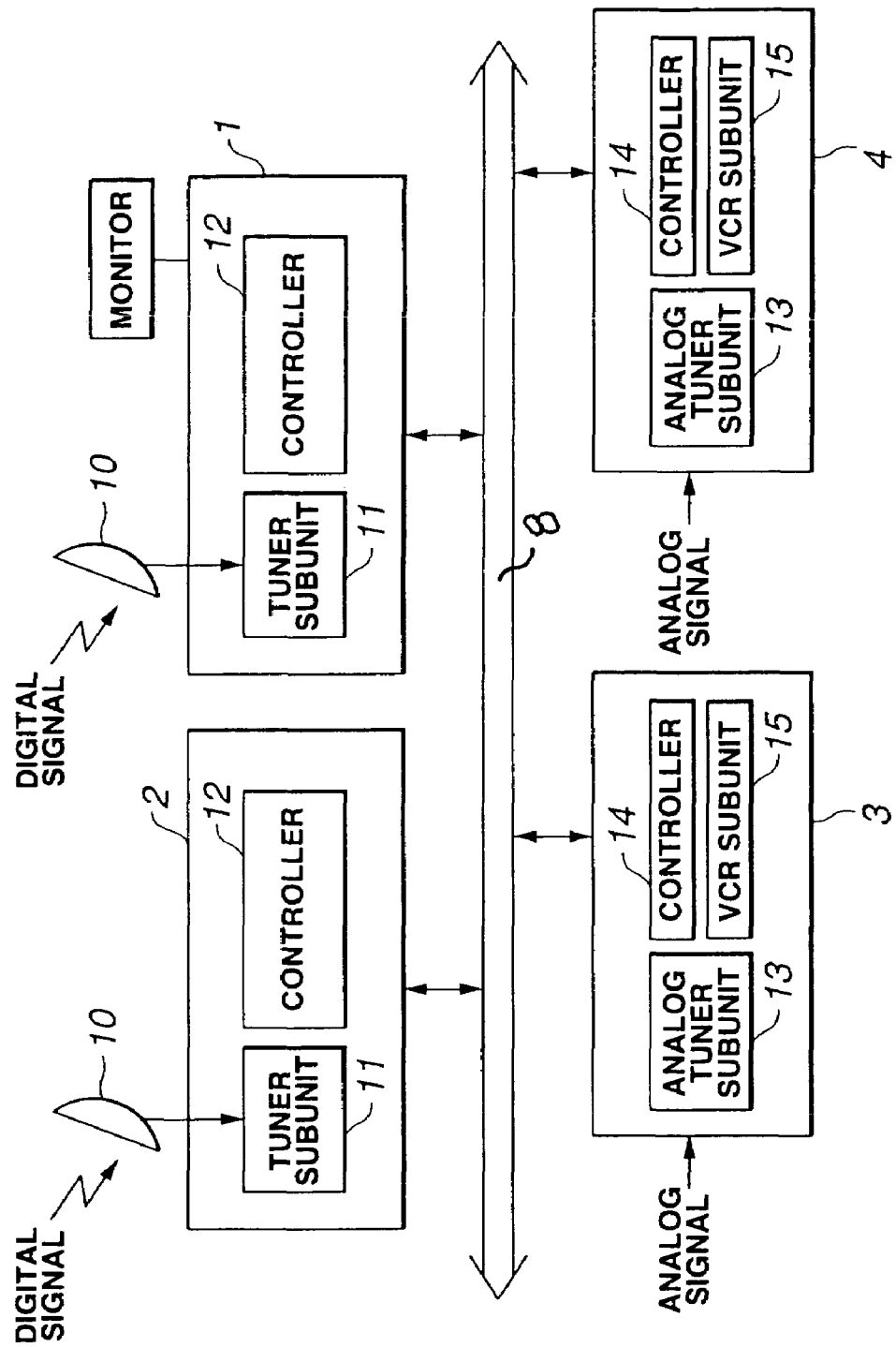
FIG. 35 is a block diagram showing a specified example of a device connected over the IEEE 1394 serial data bus.

FIG. 35 shows a specified typical device which proves the aforementioned controller or target shown in FIG. 18.

In the construction shown in FIG. 35, IRDs 1,2, equivalent to the controllers A, B and which are able to function as a portal, and DVCRS 3, 4 each equivalent to the target, such as a recorder, e.g., a D-VHS, are connected over IEEE 1394 serial data bus 8. Of course, a variety of electronic devices having IEEE 1394 terminals, such as a personal computer, hard disc drive, CD player, monitor, digital video camera or MD (trademark) player, may be connected to the bus, as are the IRDs and the DVCRs. It is assumed that the IRDs 1,2 are of the same configuration and the DVCRs 3, 4 are also of the same configuration.

The controllers 12 of the IRDs 1, 2 accept operating commands for various functions from a user, such as station selection or recording reserving, to control the IRDs 1, 2 in their entirety. The controllers 12 are able to control the DVCRs 3, 4 using the aforementioned AV/C command. A CS antenna 10 receives digital signals of a digital satellite broadcast, transmitted via a communication satellite, not shown, to output the received signals to a tuner subunit 11. The tuner subunit extracts signals of a desired channel from digital signals input from the CS antenna 10, and outputs the extracted signals to a VCR subunit 15, such as DVCR 3 or 4, over a bus 8.

The controllers 14 of the DVCRs 3, 4 accept operational commands such as replay, recording, fast feed, rewind or recording reservation, from the user, to control the DVCRs 3, 4 in their entirety. An analog tuner sub-unit 13 operates under control of the controller 14 to extract signals of a pre-set channel from input analog signals and outputs the extracted signals to a VCR subunit 15.

The VCR subunit 15 records picture signals input via the analog tuner sub-unit 13 or picture signals input over bus 8 from the tuner subunits 11 of the IRD 1 or 2 on a magnetic tape, not shown.

Although the above-described sequence of operations, such as reservation, may be executed on hardware, it may also be executed by software. In the latter case, the various functions may be executed by e.g., a personal computer having a program corresponding to the program installed therein or built in a controller as dedicated hardware.

A general-purpose personal computer 101 has enclosed therein a CPU 111 (Central Processing Unit), as shown, for example, in FIG. 36. To the CPU 111 is connected an input/output interface 116 over a bus 115. If the CPU 111 is fed with a command from a user via input/output interface 116 via an input unit 118, such as a keyboard or a mouse, it reads out a program for executing the above-described operations from a ROM 112 (Read-Only Memory), recording mediums such as hard disc 114, or recording mediums such as magnetic disc 131, optical disc 132 or a magneto-optical disc 133 loaded on a drive 120, to write the program on a RAM 113 (Random Access Memory) to execute the program. Meanwhile, the program is not limited to such a program as is pre-stored and distributed in this state to the user, but includes programs transferred from a satellite or a network and received and downloaded by a communication unit 119.

The CPU 111 outputs picture signals, among the results processed by the program, to a display unit 117, comprised of an LCD (liquid crystal display) and a CRT (cathode ray tube), over input/output interface 115.

The following explanation is made of a recording medium used for installing a program for executing the above-described sequence of operations on, e.g., a computer, for executing the program, with the computer being a general-purpose personal computer.

The program may be furnished to a user in a pre-installed state on a hard disc or in a semiconductor memory, as a recording medium accommodated in the personal computer.

Alternatively, the program may be furnished as packaged software as it is transiently or permanently stored in a floppy disc, a CD-ROM (Compact Disc-Read Only Disc), MO (magneto-optical) disc, DVD (digital versatile disc), magnetic disc or a semiconductor memory.

The program may be transferred from a download site over an artificial satellite for digital satellite broadcasting to a personal computer over a radio route, or over cables, through a network, such as local area network or the Internet, so as to be stored in an enclosed hard disc.

The medium in the present embodiment is to be construed in its broad sense to encompass all of these mediums.

In the present embodiment, the step of running a program furnished by the medium includes not only the processing executed chronologically in accordance with a stated sequence, but also the processing executed in parallel or batch-wise.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing system, comprising:
a network, said network including a plurality of communication lines, a plurality of information processing apparatuses are connected to said network by a bridge operable to interconnect at least two of said communication lines, each of said plurality of information processing apparatuses having a node identifier, the node identifier of each information apparatus connected to the communication line is updated when a reset of communication line occurs;
a first information processing apparatus connected to said network operable to perform a specified function related to audio/video signal processing for which a reservation for use has been made by an information processing apparatus connected to said network, said first information processing apparatus including a storage unit operable to store (i) identification information globally unique to said information processing apparatus which makes said reservation and (ii) a priority value of said reservation, wherein said first information processing apparatus rejects commands, other than a reservation request command, issued by information processing apparatuses other than said information processing apparatus which makes said reservation;
a second information processing apparatus connected to said network and including a control unit operable to control said specified function of said first information processing apparatus, and a command transmitting unit operable to transmit said reservation request command with (i) identification information globally unique to said second information processing apparatus and (ii) a first priority value of reservation, to said first information processing apparatus, when said second information processing apparatus makes a reservation for use of said specified function of said first information processing apparatus; and
a third information processing apparatus connected to said network and including a control unit operable to control said specified function of said first information processing apparatus, a readout unit operable to read out from said storage unit of said first information processing apparatus (i) said identification information globally unique to said second information processing apparatus and (ii) said first priority value of reservation set by said second information processing apparatus, a decision unit operable to verify whether a reservation for use of said specified function of said first information processing apparatus by said third information processing apparatus is possible based on said information read out, and a command transmitting unit operable to transmit said reservation request command with (i) identification information globally unique to said third information processing apparatus and (ii) a second priority value of reservation, to said first information processing apparatus, if it is verified that said reservation for use is possible.

2. The information processing system according to claim 1, wherein said first information processing apparatus rejects the reservation request command unless the priority thereof is higher than that of a current reservation.

3. The information processing system according to claim 1, wherein, when the reset of communication lines occurs, said first information processing apparatus clears (i) identification information globally unique to said information processing apparatus which made said reservation and (ii) a priority value of said reservation, stored in said storage unit, and rejects all commands excluding the reservation request command, until the reservation is established or a predetermined time has elapsed.

4. The information processing system according to claim 3, wherein only said information processing apparatus which has made said reservation when said reset of communication lines occurs is allowed to issue the reservation request command to said first information processing apparatus before said predetermined time has elapsed.

5. The information processing system according to claim 1, wherein said network further includes an IEEE 1394 serial data bus, and wherein said identification information globally unique to said information processing apparatus is an EUI-64.

6. An information processing method comprising the steps of:

provethinking a network having a plurality of communication lines, a plurality of information processing apparatuses being connectable to said network by a bridge operable to interconnect at least two of said communication lines, each of said plurality of information processing apparatuses having a node identifier, the node identifier of each information apparatus connected to the communication line is updated when a reset of communication line occurs;

connecting a first information processing apparatus to said network which is operable to perform a specified function related to audio/video signal processing for which a reservation for use has been made by an information processing apparatus connected to said network, said first information processing apparatus including a storage unit operable to store (i) identification information globally unique to said information processing apparatus which makes said reservation and (ii) a priority value of said reservation, wherein said first information processing apparatus rejects commands, other than a reservation request command, issued by information processing apparatuses other than said information processing apparatus which makes said reservation;

connecting a second information processing apparatus to said network which includes a control unit operable to control said specified function of said first information processing apparatus, and a command transmitting unit operable to transmit said reservation request command with (i) identification information globally unique to said second information processing apparatus and (ii) a first priority value of reservation, to said first information processing apparatus, when said second information processing apparatus makes a reservation for use of said specified function of said first information processing apparatus; and connecting a third information processing apparatus to said network which includes a control unit operable to control said specified function of said first information processing apparatus, a readout unit operable to read out from said storage unit of said first information processing apparatus (i) said identification information globally unique to said second information processing apparatus and (ii) said first priority value of reservation set by said second information processing apparatus, a decision unit operable to verify whether a reservation for use of said specified function of said first information processing apparatus by said third information processing apparatus is possible based on said information read out, and a command transmitting unit operable to transmit said reservation request command with (i) identification information globally unique to said third information processing apparatus and (ii) a second priority value of reservation, to said first information processing apparatus, if verified that said reservation for use is possible.

7. The information processing method according to claim 6, wherein said first information processing apparatus rejects the reservation request command unless the priority thereof is higher than that of a current reservation.

8. The information processing method according to claim 6, wherein, when the reset of communication lines occurs, said first information processing apparatus clears (i) identification information globally unique to said information processing apparatus which made said reservation and (ii) a priority value of said reservation, stored in said storage unit, and rejects all commands excluding the reservation request command, until the reservation is established or a predetermined time has elapsed.

9. The information processing method according to claim 8, wherein only said information processing apparatus which has made said reservation when said reset of communication lines occurs is allowed to issue the reservation request command to said first information processing apparatus before said predetermined time has elapsed.

10. The information processing method according to claim 6, wherein said network further includes an IEEE 1394 serial data bus, and wherein said identification information globally unique to said information processing apparatus is an EUI-64.

* * * * *